(12) United States Patent
Ono et al.

(10) Patent No.: US 10,543,883 B2
(45) Date of Patent: Jan. 28, 2020

(54) SPEED CHANGE APPARATUS FOR VEHICLE

(71) Applicant: HONDA MOTOR CO., LTD., Tokyo (JP)

(72) Inventors: Junya Ono, Wako (JP); Jun Adachi, Wako (JP); Yoshiaki Nedachi, Wako (JP); Tatsuya Ryuzaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 979 days.

(21) Appl. No.: 15/081,360

(22) Filed: Mar. 25, 2016

(65) Prior Publication Data

US 2016/0288879 A1  Oct. 6, 2016

(30) Foreign Application Priority Data

Mar. 30, 2015  (JP) .................. 2015-070064

(51) Int. Cl.
*F16H 63/08* (2006.01)
*B62M 11/06* (2006.01)
*F16H 63/30* (2006.01)

(52) U.S. Cl.
CPC ............ *B62M 11/06* (2013.01); *F16H 63/08* (2013.01); *F16H 63/30* (2013.01); *F16D 2500/1021* (2013.01); *F16D 2500/1045* (2013.01); *F16D 2500/10412* (2013.01); *F16D 2500/3021* (2013.01); *F16D 2500/5016* (2013.01); *F16H 2063/3093* (2013.01)

(58) Field of Classification Search
CPC .. F16H 63/08; F16H 63/30; F16H 2057/0203; F16H 2063/3093; B62M 11/06

USPC .................................... 74/335, 337.5
See application file for complete search history.

(56) References Cited

U.S. PATENT DOCUMENTS

| 6,370,977 B1 * | 4/2002 | Kubo ................. F16H 57/0006 74/342 |
| 2016/0290442 A1 * | 10/2016 | Adachi .................. F16H 63/18 |
| 2016/0290500 A1 * | 10/2016 | Ono ........................ F16H 61/32 |

FOREIGN PATENT DOCUMENTS

| JP | 08-93786 A | 4/1996 |
| JP | 2001-280493 | * 10/2001 |
| JP | 2014-199102 A | 10/2014 |

* cited by examiner

*Primary Examiner* — William C Joyce
(74) *Attorney, Agent, or Firm* — Birch, Stewart, Kolasch & Birch, LLP

(57) ABSTRACT

In a speed change apparatus for a vehicle, a controller stores as a clutch-disengaging shift spindle angle θ1 a position at which a clutch is disengaged when a shift spindle is rotated in a first direction. The controller controls the shift spindle by a first step W1 of rotating the shift spindle in the first direction until a disengaging-side target angle Ta1 is reached; a second step W2 of returning the shift spindle in a second direction opposite to the first direction; and a third step W3 of rotating the shift spindle in the first direction up to the clutch-disengaging shift spindle angle θ1 and thereafter rotating the shift spindle in the second direction to return the shift spindle, upon detection of an output from a drum angle sensor, the output corresponding to shallow engagement of dog teeth.

20 Claims, 26 Drawing Sheets

SPEED CHANGE APPARATUS FOR VEHICLE

CROSS-REFERENCE TO RELATED APPLICATIONS

The present application claims priority under 35 USC 119 to Japanese Patent Application No. 2015-070064 filed Mar. 30, 2015 the entire contents of which are hereby incorporated by reference.

BACKGROUND OF THE INVENTION

1. Field of the Invention

The present invention relates to a speed change apparatus for a vehicle.

2. Description of Background Art

A dog clutch transmission of the so-called automated manual transmission (AMT) type is known wherein a shift is conducted automatically. This structure makes it easy to restrain the "shallow engagement" of dog teeth which might occur when the clutch disengagement time during a shift is short. The shallow engagement of dog teeth refers to a condition wherein the depth of the mesh of dog teeth is shallower than the depth of the mesh in a normal engagement state of dog teeth. In the shallow engagement canceling mechanism in the conventional example, a wavy profile is set in a shift-up direction of a clutch lifter cam plate. When the clutch lifter cam plate is rotated in the shift-up direction, an engagement/disengagement operation can be instantaneously repeated in the manner of clutch disengagement-→engagement→disengagement, whereby shallow engagement can be canceled. When a driving force is acting on the transmission, the shallow engagement of dog teeth is maintained by a frictional force between driving force transmitting surfaces of the dog teeth which abut on each other. When the driving force acting on the transmission is removed, the dog teeth are permitted to move to a normal depth of mesh, whereby the shallow engagement is canceled. See, for example, Japanese Patent Laid-Open No. 2014-199102.

On the other hand, while the conventional example describes a shift in the shift-up direction and the cancellation of the shallow engagement, the example does not describe a shift in a shift-down direction. The transmission in the conventional example adopts a so-called interlocked spindle system wherein both a clutch lever and a transmission master arm are operated by a single shift spindle. Between the shift spindle and the master arm, a force accumulation mechanism is interposed. The force accumulation mechanism operates only in the shift-up direction to accumulate a rotational amount and a load of the shift spindle. This force accumulation mechanism does not operate in the shift-down direction. The shift spindle is so configured that when the shift spindle is rotated in the shift-down direction, a gear shift arm is rotated by an amount corresponding to a circumferential clearance between the gear shift arm and the master arm (in the course of this operation, the clutch is disengaged) and, thereafter, the gear shift arm moves the master arm.

In the structure of the conventional example, at the time of a shift in the shift-down direction, the shift can be performed as follows. When the shift spindle is rotated to a shift-down side target angle and a certain lapse of time is waited for in a condition where the clutch is disengaged and a driving force is not transmitted, the master arm is rotated during the waiting time and gear trains are moved, so that dog teeth are moved into normal positions, whereby the shift can be completed. In an AMT type vehicle, however, the driving force non-transmission period during an automatically performed shift may cause an uncomfortable feeling for the driver. In order to reduce the uncomfortable feeling about the driving force non-transmission, it is necessary to shorten the time for which the clutch is in a disengaged state. If the driving force non-transmission period is shortened, however, the time allowed for operations and movements of a change system and transmission gears is shortened, so that shallow engagement of dog teeth is liable to occur. For example, when "dog abutment" wherein top surfaces of dog teeth abut on each other is generated, a certain length of time may be needed for cancellation (removal) of the dog abutment. If a driving force is exerted immediately after the dog abutment is canceled, driving force transmitting surfaces on the tip side of the dog teeth may contact each other before the dog teeth mesh with each other in a normal depth of mesh, resulting in shallow engagement.

Thus, shallow engagement becomes liable to occur when the driving force non-transmission period during a shift on the shift-down side is shortened. Therefore, cancellation of the shallow engagement becomes a task. In the transmission according to the conventional example, rotation of the shift spindle toward the shift-down side disengages the clutch first, and thereafter rotates the master arm. When the shift spindle is again rotated toward the shift-down side after the shallow engagement for the purpose of canceling the shallow engagement, the clutch is first disengaged and the shallow engagement is thereby canceled. However, when the shift spindle is further rotated in the shift-down direction, a shifting-down operation on the change mechanism is carried out once more. In other words, if the shift spindle is rotated once more in the shift-down direction at the time of canceling the shallow engagement on the shift-down side, a shift-down in an amount corresponding to two gear positions (speeds) would possibly be carried out, depending on the rotational amount of the shift spindle.

OBJECTS AND SUMMARY OF THE INVENTION

The present invention has been made in consideration of the above-mentioned problem in the related art. Accordingly, it is an object of an embodiment of the present invention to shorten a driving force non-transmission period during a shift and prevent a shift in an amount corresponding to two gear positions from being made at the time of cancellation of shallow engagement, in a speed change apparatus for a vehicle.

In order to achieve the above object, according to an embodiment of the present invention, there is provided a speed change apparatus for a vehicle, including a transmission (60). The transmission (60) includes a main shaft (65) to which rotational power of a crankshaft (23) of an engine (21) is transmitted through a clutch (61) with a counter shaft (66) disposed in parallel to the main shaft (65) and a driving-side shifter gear (67b) rotated as one body with the main shaft (65) and movable in an axial direction. A driving-side free gear (67a, 67c) is rotatable relative to the main shaft (65) and fixed in the axial direction with a dog clutch engageable and disengageable through dog teeth (67b1, 67c1) erected in the axial direction from opposed surfaces of the driving-side shifter gear (67b) and the driving-side free gear (67a, 67c). A driven-side shifter gear (68c) is rotated as one body with the counter shaft (66) and movable in the axial direction with a driven-side free gear (68*b*, 68*d*) rotatable relative to the counter shaft (66) and fixed in the axial direction. A dog clutch engageable and disengageable through dog teeth erected in the axial direction from opposed surfaces of the driven-side shifter gear (68*c*) and the driven-side free gear (68*b*, 68*d*). The speed change apparatus also includes a change mechanism (89). The change mechanism (89) includes a plurality of shift forks (69*a*, 69*b*) adapted to move the driving-side shifter gear (67*b*) and the driven-side shifter gear (68*c*) in the axial direction with a shift drum (70) formed in an outer circumferential surface thereof with a plurality of grooves (70*a*) for engagement with end portions of the shift forks (69*a*, 69*b*). The speed change apparatus further includes a shift spindle (76) which is provided with a clutch lever (82) adapted to operate engagement/disengagement of the clutch (61) and is provided, in a relatively rotatable manner, with a master arm (80) adapted to operate the change mechanism (89). An actuator (75) is adapted to drive the shift spindle (76) with a shift spindle angle sensor (79) adapted to detect a rotational angle of the shift spindle (76). A controller (17) is adapted to control the actuator (75) with a drum angle sensor (70*b*) adapted to detect a rotational angle of the shift drum (70). In the speed change apparatus for a vehicle, the shift spindle (76) is so configured that, when rotated in a first direction, the shift spindle (76) first operates the clutch lever (82) to disengage the clutch (61) and thereafter rotates the master arm (80) to operate the change mechanism (89). In addition, the controller (17) stores as a clutch-disengaging shift spindle angle ($\theta1$) a position at which the clutch (61) is disengaged when the shift spindle (76) is rotated in the first direction. Further, the controller (17) controls the shift spindle (76) by a first step (W1) of rotating the shift spindle (76) in the first direction until the shift spindle (76) reaches a first target rotational angle (Ta1) with a second step (W2) of returning the shift spindle (76) in a second direction opposite to the first direction. A third step (W3) of rotating the shift spindle (76) is provided in the first direction up to the clutch-disengaging shift spindle angle ($\theta1$) and thereafter rotating the shift spindle (76) in the second direction to return the shift spindle (76), upon detection of an output from the drum angle sensor (70*b*), the output corresponding to shallow engagement of the dog teeth (67*b*1, 67*c*1).

According to an embodiment of the present invention, when shallow engagement is generated during a shift conducted in the first step and the second step, the controller executes the third step. In the third step, the controller rotates the shift spindle up to the clutch-disengaging shift spindle angle previously stored therein, so as to only disengage the clutch without operating the change mechanism, thereby canceling the shallow engagement, and thereafter (after the cancellation of shallow engagement) returns the shift spindle. Consequently, a shift in an amount corresponding to two gear positions (speeds) can be prevented from being made during a shifting operation including a shallow engagement canceling process. In addition, the time for which the clutch is in a disengaged state during such an operation can be shortened, and the driving force non-transmission period during such an operation can be shortened.

The speed change apparatus for a vehicle according to the present invention may have a configuration wherein at the time of rotating the shift spindle (76) in the first direction, the controller (17) sets the clutch-disengaging shift spindle angle ($\theta1$) on the basis of a rotational angle of the shift spindle (76) corresponding to a rotational angle of the shift drum (70) at a start of rotation to a next shift position detected by the drum angle sensor (70*b*).

According to an embodiment of the present invention, at the time of rotating the shift spindle in the first direction, the controller sets the clutch-disengaging shift spindle angle on the basis of the rotational angle of the shift spindle corresponding to the rotational angle of the shift drum at the start of rotation toward the next shift position detected by the drum angle sensor. In an embodiment of the present invention, when the shift drum starts rotating toward the next shift position, the clutch is in a disengaged state. Therefore, the clutch-disengaging shift spindle angle can be easily set, on the basis of the rotational angle of the shift spindle corresponding to the rotational angle at the start of rotation of the shift drum.

The speed change apparatus for a vehicle according to an embodiment of the present invention may have a configuration wherein the controller (17) learns the clutch-disengaging shift spindle angle ($\theta1$) through ramp response.

According to an embodiment of the present invention, the controller learns the clutch-disengaging shift spindle angle through ramp response. Therefore, the controller can accurately learn the clutch-disengaging shift spindle angle, on the basis of the rotational angle of the shift spindle being rotated comparatively slowly.

Further, the speed change apparatus for a vehicle according to the present invention may have a configuration wherein the controller (17) proceeds to the second step (W2) when dog abutment is detected on the basis of a rotational angle of the shift drum (70) during the first step (W1).

According to an embodiment of the present invention, when dog abutment is detected on the basis of the rotational angle of the shift drum during the first step, the controller proceeds to the second step. In the condition in which the dog abutment has occurred, the clutch has already been disengaged and the change mechanism is operating. When dog abutment is detected, the controller winds up the rotation (feeding) of the shift spindle to the first target rotational angle in its course, and, in the second step, returns the shift spindle. Therefore, the driving force non-transmission period due to the disengagement of the clutch can be shortened.

In the speed change apparatus for a vehicle according to an embodiment of the present invention, a shift in an amount corresponding to two gear positions (speeds) can be prevented from being made during a shifting operation including a shallow engagement canceling process. In addition, the time for which the clutch is in a disengaged state during such an operation can be shortened, and the driving force non-transmission period during such an operation can be shortened.

In addition, the clutch-disengaging shift spindle angle can be easily set on the basis of the rotational angle of the shift spindle corresponding to the rotational angle at the start of rotation of the shift drum.

Further, the clutch-disengaging shift spindle angle can be accurately learnt on the basis of the rotational angle of the shift spindle being rotated comparatively slowly by ramp response.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
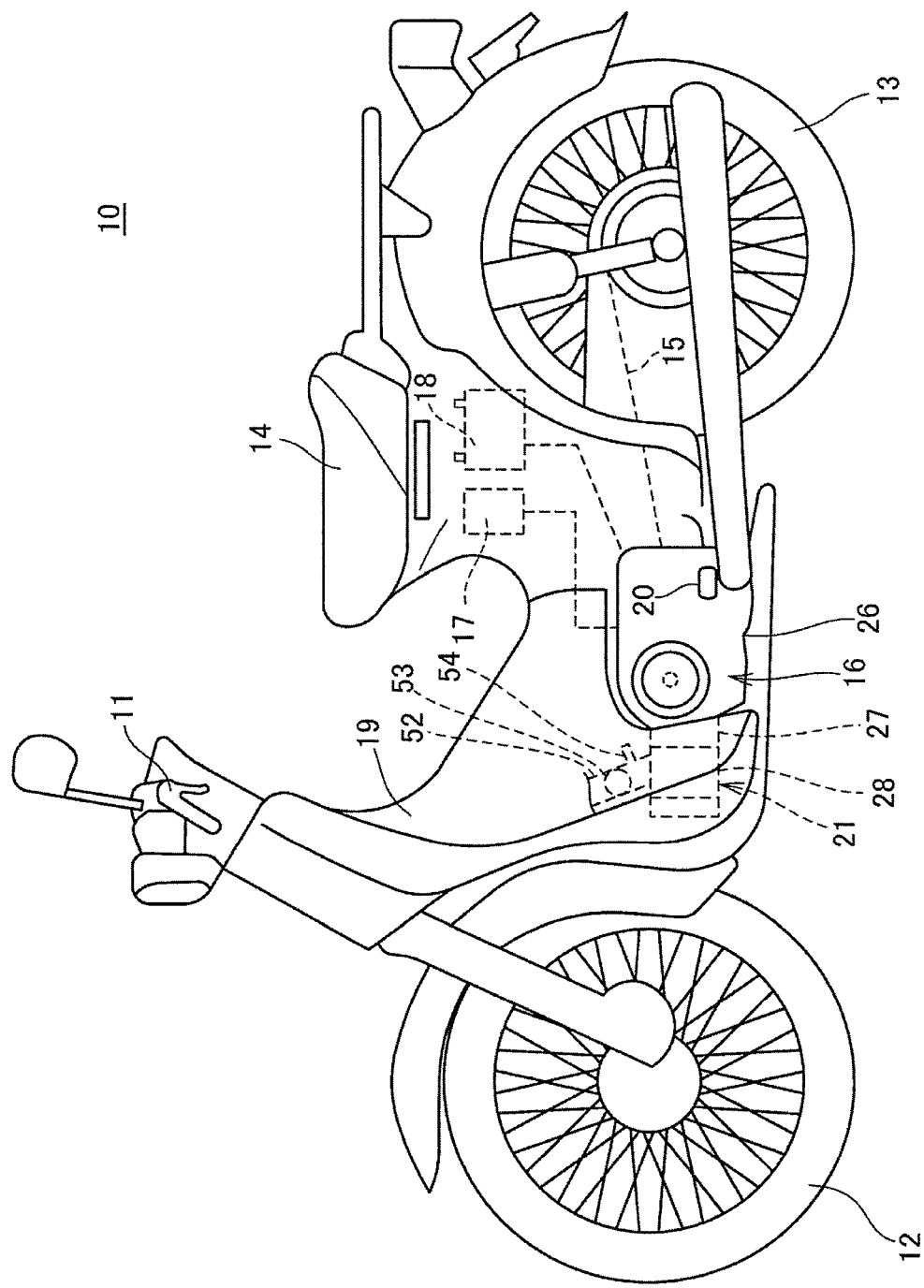
FIG. 1 is a left side view of a motorcycle provided with an automatic speed change apparatus according to an embodiment of the present invention.

An embodiment of the present invention will now be described below referring to the drawings.

FIG. 1 is a left side view of a motorcycle 10 provided with an automatic speed change apparatus 25 according to an embodiment of the present invention.

The motorcycle 10 (vehicle) includes a handlebar 11 rotatably supported on a head pipe (not shown), a front wheel 12 steered by the handlebar 11, a rear wheel 13 as a driving wheel, a seat 14 on which to seat a driver, a power unit 16 adapted to supply a driving force to the rear wheel 13 through a chain 15, a control unit 17 (controller) adapted to control the power unit 16, and a battery 18.

The motorcycle 10 is configured based on a body frame (not shown), and the body frame is covered with a body cover 19. The control unit 17 and the battery 18 are disposed under the seat 14 and inside the body cover 19. The power unit 16 is provided at a roughly middle position between the front wheel 12 and the rear wheel 13, downwardly and slightly forwardly of the seat 14. A pair of left and right driver footrests 20 are provided at lower portions of the power unit 16.

The configuration of the power unit 16 will now be described.

Figure 2:
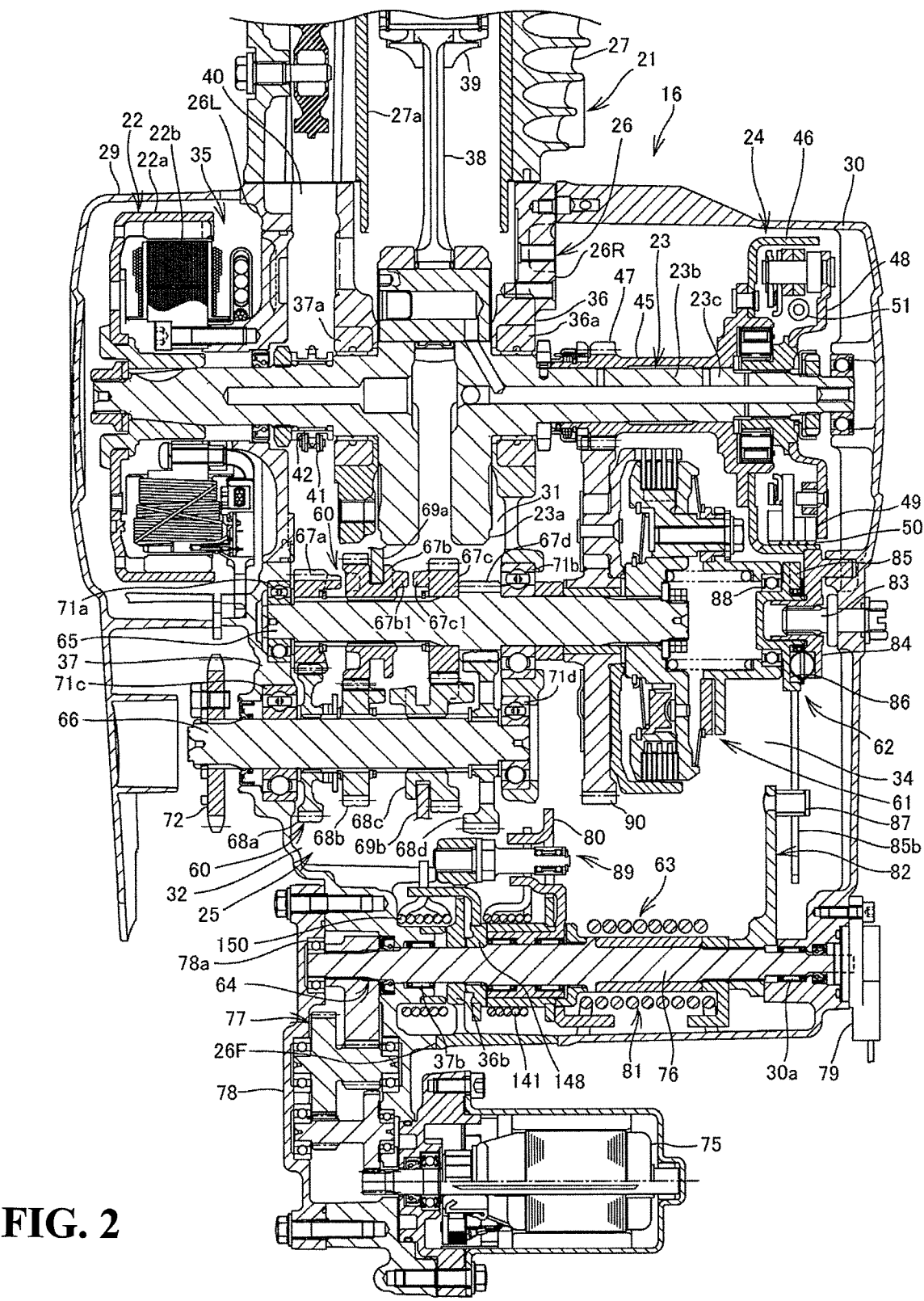
FIG. 2 is a sectional view of a power unit.

FIG. 2 is a sectional view of the power unit 16. In FIG. 2, the left-right direction on the sheet surface corresponds to the transverse direction (vehicle width direction), the upward direction on the sheet surface corresponds to the forward direction of the vehicle, and the downward direction on the sheet surface corresponds to the rearward direction of the vehicle.

The power unit 16 includes an engine 21 adapted to generate a driving force for operating, a generator 22, a starting clutch 24 provided on a crankshaft 23 of the engine 21, and the automatic speed change apparatus 25 (speed change apparatus) adapted to output a driving force of the crankshaft 23 (which is outputted through the starting clutch 24) with a speed change.

The engine 21 is configured by integrally connecting a crankcase 26 (case member), a cylinder 27, and a cylinder head 28.

As illustrated in FIG. 1, an intake pipe 52 extending from an air cleaner box (not shown) is connected to an intake port of the cylinder head 28. The intake pipe 52 is provided with an electronically controlled throttle valve 53 for regulating the quantity of air supplied to the engine 21. In the intake pipe 52, a fuel injection valve 54 is provided downstream of the throttle valve 53.

The crankcase 26 is configured to be bisected to a left portion and a right portion (in the transverse direction) at a plane orthogonal to the crankshaft 23. More specifically, the crankcase 26 has a one-side case half 26L on the left side and an other-side case half 26R on the right side. In addition, the engine 21 is provided with a generator cover 29 which covers the one-side case half 26L from the left side, and a clutch cover 30 which covers the other-side case half 26R from the right side.

The one-side case half 26L and the other-side case half 26R are mated with each other at a faying surface 26F (faying portion), and are coupled together by a plurality of coupling bolts (not shown) extending in the transverse direction.

A crank chamber 31 in which to accommodate the crankshaft 23 is provided at a front portion of the inside of the crankcase 26. In the crankcase 26, a transmission chamber 32 is provided rearwardly of the crank chamber 31. The transmission chamber 32 is partitioned by a wall portion 37 (a wall portion of the case member; outer wall) of the one-side case half 26L constituting a left side surface of the crankcase 26, and a wall portion 36 (inner wall) of the other-side case half 26R constituting a right side surface of the crankcase 26.

A clutch chamber 34 is provided on the right side of the crank chamber 31 and the transmission chamber 32. A generator chamber 35 is provided on the left side of the crank chamber 31. The clutch chamber 34 is partitioned by an outside surface of the wall portion 36 of the other-side case half 26R and an inside surface of the clutch cover 30. The generator chamber 35 is partitioned by an outside surface of the wall portion 37 of the one-side case half 26L and an inside surface of the generator cover 29.

The crankshaft 23 has a crank web 23a, and a shaft portion 23b extending toward both sides in the transverse direction from the crank web 23a. Of the crankshaft 23, the crank web 23a is disposed within the crank chamber 31, and the shaft portion 23b is rotatably borne on bearing portions 36a and 37a provided respectively at the wall portion 36 and the wall portion 37. A connecting rod 38 is connected to the crank web 23a through a crank pin. A piston 39 connected to a tip of the connecting rod 38 is reciprocated within a cylinder bore 27a of the cylinder 27.

One end of the shaft portion 23b of the crankshaft 23 extends into the generator chamber 35, and this end is fixed to a rotor 22a of the generator 22. A stator 22b of the generator 22 is fixed to the one-side case half 26L.

The wall portion 37 is provided with a cam chain chamber 40 on the inside thereof. A cam chain 41 for driving a valve mechanism (not shown) in the cylinder head 28 extends through the cam chain chamber 40 and is wrapped around a driving sprocket 42 on the shaft portion 23b.

An other end 23c of the shaft portion 23b of the crankshaft 23 extends into the clutch chamber 34. The starting clutch 24 of a centrifugal type is provided at a tip portion of the other end 23c.

The starting clutch 24 serves for engagement and disengagement between the crankshaft 23 and the automatic speed change apparatus 25 at the time of starting of the vehicle and at the time of stopping of the vehicle.

The starting clutch 24 includes a cup-shaped outer case 46 fixed to one end of a sleeve 45 rotatable relative to the outer circumference of the crankshaft 23; a primary gear 47 provided at the outer circumference of the sleeve 45; an outer plate 48 fixed to a right end portion of the crankshaft 23; a shoe 50 attached to an outer circumferential portion of the outer plate 48 through a weight 49 so as to be directed radially outward; and a spring 51 for biasing the shoe 50 radially inward. The starting clutch 24 is configured so that when the rotational speed of the engine is not more than a predetermined value, the outer case 46 and the shoe 50 are separate from each other, and the crankshaft 23 and the automatic speed change apparatus 25 are in a disengaged state from each other (in a separated state where power is not transmitted therebetween). When the engine rotational speed rises to exceed a predetermined value, a centrifugal force causes the weight 49 to move radially outward against the spring 51, which brings the shoe 50 into contact with an inner circumferential surface of the outer case 46. This causes the sleeve 45 to be fixed onto the crankshaft 23 together with the outer case 46, resulting in that the rotation of the crankshaft 23 is transmitted to the automatic speed change apparatus 25 through the primary gear 47.

In the automatic speed change apparatus 25, switching-over of a change clutch 61 which will be described later and switching-over of gear position (shift) are performed automatically.

The automatic speed change apparatus 25 includes a forward four-speed normally meshed transmission 60; the change clutch 61 (clutch) adapted to switch over the connection between the crankshaft 23 side and the transmission 60; a clutch operation mechanism 62 adapted to operate the change clutch 61; a gear change mechanism 63 adapted to change gear in the transmission 60; and an actuator mechanism 64 adapted to drive the clutch operation mechanism 62 and the gear change mechanism 63. The actuator mechanism 64 is controlled by the control unit 17 (FIG. 1).

The automatic speed change apparatus 25 is connected to a mode switch 132b (FIG. 9) for switching between an automatic transmission (AT) mode and a manual transmission (MT) mode, and to a shift selection switch 132a (FIG. 9) operated by the driver to select either a shift-up or a shift-down. The automatic speed change apparatus 25 is so configured that under a control of the control unit 17, the actuator mechanism 64 can be controlled according to output signals from sensors as well as the mode switch 132b and the shift selection switch 132a, thereby the gear position in the transmission 60 can be changed automatically or semi-automatically.

More specifically, in the automatic transmission mode, the actuator mechanism 64 is controlled on the basis of vehicle speed and the like, and a gear change (shift) in the transmission 60 is performed automatically. In the manual transmission mode, the driver operates the shift selection switch 132a to make a gear shift.

The transmission 60 transmits rotation, supplied from the change clutch 61, to the rear wheel 13 with a speed change based on a command from the control unit 17. The transmission 60 includes a main shaft 65 as an input shaft; a counter shaft 66 disposed in parallel to the main shaft 65; driving gears 67a, 67b, 67c and 67d (a row of driving gears) provided on the main shaft 65; and driven gears 68a, 68b, 68c and 68d (a row of driven gears) provided on the counter shaft 66.

The driving gears 67a, 67b, 67c and 67d are in mesh with the driven gears 68a, 68b, 68c and 68d in this order. The driving gear 67b has dog teeth on a side surface thereof to be engaged with the adjacent driving gear 67a or 67c when the driving gear 67b is slid to the left or the right. The driven gear 68c has dog teeth on a side surface thereof to be engaged with the adjacent driven gear 68b or 68d when the driven gear 68c is slid to the left or the right.

The driving gears 67a and 67c (driving-side free gears) and the driven gears 68b and 68d (driven-side free gears) are free gears which are relatively rotatably retained on, and axially movable relative to, the main shaft 65 and the counter shaft 66, respectively.

The driving gear 67b (driving-side shifter gear) and the driven gear 68c (driven-side shifter gear) are shifter gears which are non-rotatably spline-coupled to, and axially slidable relative to, the main shaft 65 and the counter shaft 66, respectively.

The driving gear 67d and the driven gear 68a are fixed gears which are fixed to the main shaft 65 and the counter shaft 66, respectively.

For example, when the driving gear 67*b* (which is a shifter gear) is slid toward the side of the driving gear 67*c* (which is a free gear) by the gear change mechanism 63, the dog teeth 67*b*1 and 67*c*1 erected on opposed side surfaces of the driving gear 67*b* and the driving gear 67*c* mesh with each other at their side portions, whereby the driving gear 67*b* and the driving gear 67*c* are connected. As a result, the driving gear 67*c* (a free gear) is non-rotatably fixed on the main shaft 65 by the driving gear 67*b* which is non-rotatable relative to the main shaft 65, and a shift position defined by the driving gear 67*c* and the driven gear 68*c* is established. A plurality of dog teeth 67*b*1 and 67*c*1 are formed at intervals along the circumferential direction, and constitute a dog clutch for connecting the driving gear 67*b* and the driving gear 67*c* in an engageable and disengageable manner.

In addition, the driving gear 67*b* and the driving gear 67*a* are connected, the driven gear 68*c* and the driven gear 68*b* are connected, and the driven gear 68*c* and the driven gear 68*d* are connected, through respective similar clutches provided on their side surfaces in an engageable and disengageable manner.

The main shaft 65 is rotatably supported by bearings 71*a* and 71*b*, and the counter shaft 66 is rotatably supported by bearings 71*c* and 71*d*.

A sprocket 72 is provided at an end portion of the counter shaft 66. The sprocket 72 transmits rotation to the rear wheel 13 through the chain 15. In addition, a vehicle speed sensor 73 (FIG. 9), adapted to detect rotational speed of the counter shaft 66 in a non-contact manner, is provided in the vicinity of the counter shaft 66. The control unit 17 calculates the vehicle speed from a value detected by the vehicle speed sensor 73. Further, a main shaft rotational speed sensor 65*a* (FIG. 9) adapted to detect rotational speed of the main shaft 65 in a non-contact manner is provided in the vicinity of the main shaft 65.

Figure 3:
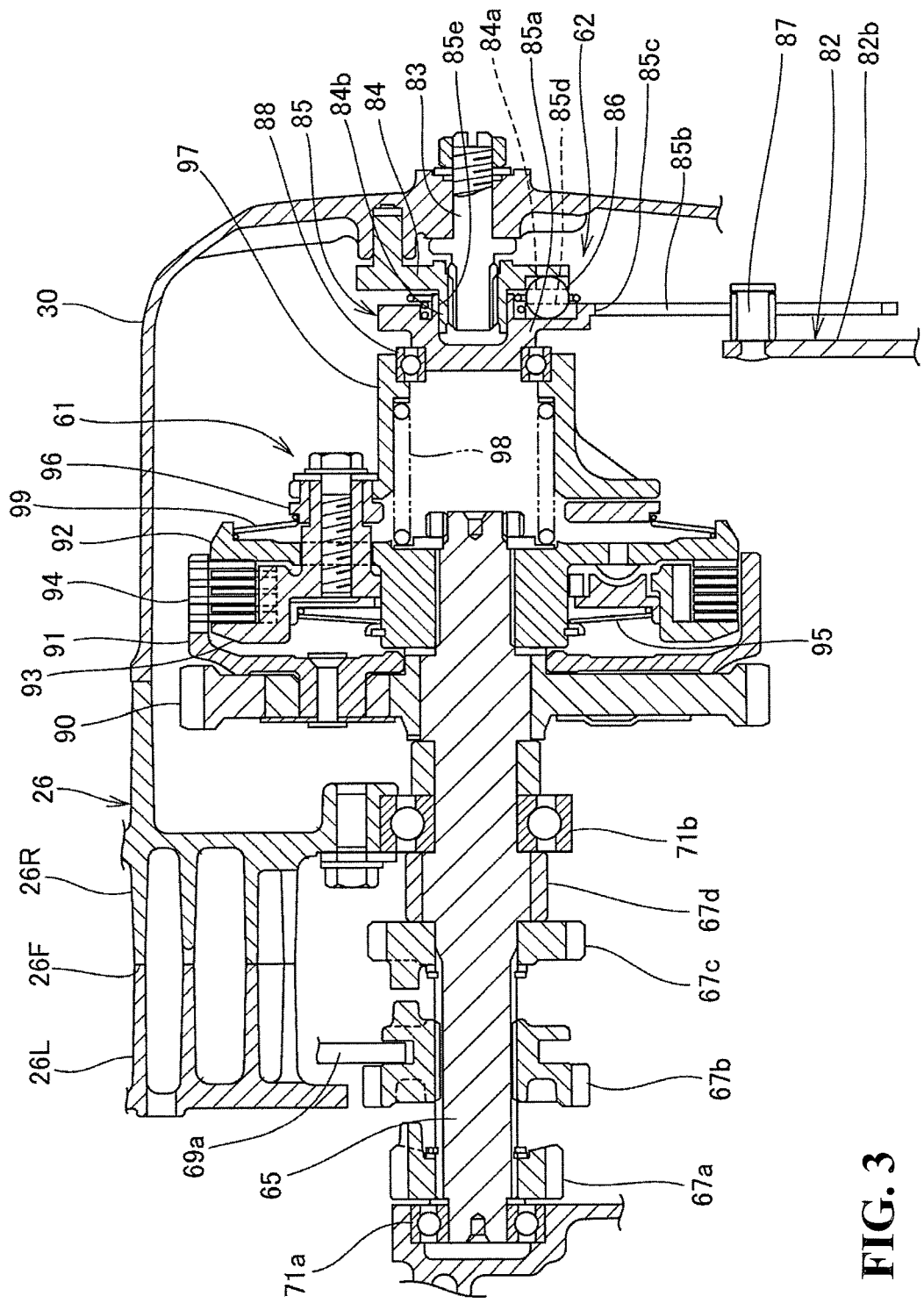
FIG. 3 is a sectional view showing a gear change mechanism, an actuator mechanism, a change clutch and a clutch operation mechanism.

FIG. 3 is a sectional view showing the change clutch 61 and the clutch operation mechanism 62.

Referring to FIGS. 2 and 3, the actuator mechanism 64 includes a shift motor 75 as an actuator; a shift spindle 76 extending in the transverse direction within the crankcase 26; and a speed reduction gear train 77 adapted to transmit the rotation of the shift motor 75 with speed reduction to drive the shift spindle 76. One end in the axial direction of the speed reduction gear train 77 is supported on an outside surface of the wall portion 37 of the one-side case half 26L, and the other end is supported by a cover 78 covering the wall portion 37 from an outer side.

The shift spindle 76 is provided to extend through the inside of the clutch chamber 34. The shift spindle 76 is rotatably supported at its both ends by bearings 78*a* and 30*a* provided at the cover 78 and the clutch cover 30, respectively. In addition, the shift spindle 76 is rotatably supported at its intermediate portion by a bearing 37*b* provided at the wall portion 37 of the one-side case half 26L. A shift spindle angle sensor 79, adapted to detect rotational position of the shift spindle 76, is provided on the clutch cover 30.

The gear change mechanism 63 includes a change mechanism 89 adapted to slide the driving gear 67*b* and the driven gear 68*c* to thereby change a shift position; and a force accumulation mechanism 81 by which a force is accumulated in a force accumulation spring 145 (FIG. 10) (described later) by rotation of the shift spindle 76 and is thereafter released to rotate the change mechanism 89 at a stroke. The shift spindle 76 is shared by the force accumulation mechanism 81 and the clutch operation mechanism 62.

The change mechanism 89 includes a master arm 80 supported by the shift spindle 76 and rotated by the force accumulation mechanism 81; a shift drum 70 (FIG. 13) rotated interlockedly with rotation of the master arm 80; shift forks 69*a* and 69*b* adapted to connect the shift drum 70 to the driving gear 67*b* and the driven gear 68*c* which are shifter gears; and a support shaft (not shown) adapted to hold the shift forks 69*a* and 69*b* in an axially slidable manner.

The shift drum 70 is provided in its outer circumferential portion with a plurality of grooves 70*a* (FIG. 13) shaped according to shift patterns. One-side ends of the shift forks 69*a* and 69*b* are connected to the grooves 70*a*.

When the shift drum 70 is driven by the actuator mechanism 64 to rotate, the shift forks 69*a* and 69*b* are moved in the axial direction along the grooves 70*a* of the shift drum 70, whereby the driving gear 67*b* and the driven gear 68*c* are slid according to a shift position.

In the transmission 60, according to sliding of the driving gear 67*b* and the driven gear 68*c*, either a neutral condition or a condition of power transmission through selective use of any one of first-speed to fourth-speed transmission gear pairs can be established between the main shaft 65 and the counter shaft 66.

The clutch operation mechanism 62 includes a clutch lever 82 fixed onto the shift spindle 76; a support shaft 83 fixed to an inside surface of the clutch cover 30 in a positional relation such as to be substantially coaxial with the main shaft 65; a plate-shaped base member 84 fixed to the support shaft 83; a lifter cam plate 85 as an operating member which is connected to the clutch lever 82 and is opposed to the base member 84; and a plurality of balls 86 retained between the lifter cam plate 85 and the base member 84.

The clutch lever 82 includes a cylindrical portion 82*a* provided on the shift spindle 76 adjacently to the force accumulation mechanism 81 and a lever portion 82*b* extending radially outward from the cylindrical portion 82*a*. The clutch lever 82 is rotated as one body with the shift spindle 76.

The lifter cam plate 85 includes a pressing operation portion 85*a* facing the base member 84; a connection arm portion 85*b* extending from the pressing operation portion 85*a* and connected to the lever portion 82*b* of the clutch lever 82; and a cam hole 85*c* formed in the connection arm portion 85*b*. The lifter cam plate 85 is connected to the clutch lever 82 by a structure in which a pin 87 provided at the tip of the lever portion 82*b* of the clutch lever 82 is inserted in the cam hole 85*c*.

Opposed surfaces of the pressing operation portion 85*a* and the base member 84 are formed with slant surface-shaped cam portions 85*d* and 84*a*, respectively. The balls 86 are retained between the cam portions 85*d* and 84*a*. The lifter cam plate 85 is guided in regard of its axial movement by a structure in which a guide shaft 84*b* of the base member 84 is fitted in a guide hole 85*e* formed in the center of the lifter cam plate 85. In addition, a ball bearing 88 is provided at a tip portion of the pressing operation portion 85*a*. The lifter cam plate 85 is connected to the change clutch 61 through the ball bearing 88.

When the clutch lever 82 is rotated, the lifter cam plate 85 is rotated about the guide shaft 84*b* through the pin 87, and is moved (lifted) in the axial direction through sliding of the cam portion 85*d* relative to the balls 86. The change clutch 61 is engaged and disengaged interlockedly with the axial movement of the lifter cam plate 85. The lifter cam plate 85 is moved in a clutch-disengaging direction irrespectively of whether the rotation of the shift spindle 76 from a normal position is in a shift-up direction or in a shift-down direction.

Figure 4:
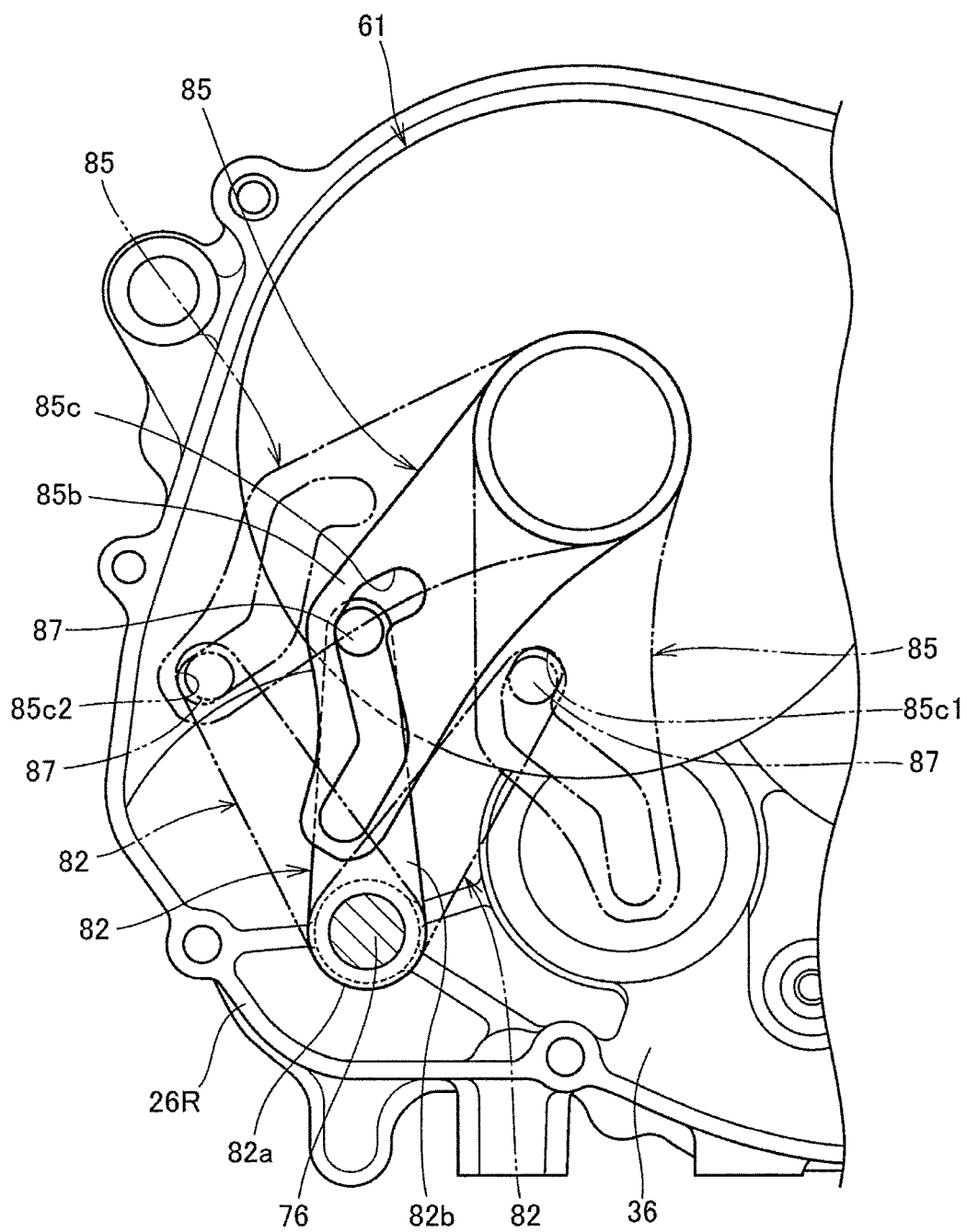
FIG. 4 is a side view showing an operating condition of a clutch lever and a lifter cam plate.

FIG. 4 is a side view showing an operating condition of the clutch lever 82 and the lifter cam plate 85.

The cam hole 85c of the lifter cam plate 85 is formed in a shape of being bent along a longitudinal direction of the connection arm portion 85b. As the shift spindle 76 rotates, the pin 87 of the clutch lever 82 moves within the cam hole 85c, whereby the lifter cam plate 85 is rotated. In other words, the axial moving amount of the lifter cam plate 85 per unit rotational amount can be set by the shape of the cam hole 85c, whereby engagement/disengagement characteristics of the change clutch 61 can be adjusted.

The shift spindle 76 is in a neutral position at normal times when neither a shift-up operation nor a shift-down operation is being conducted. In the neutral position, the clutch lever 82 extends upwardly substantially vertically from the shift spindle 76, and the pin 87 is located at an intermediate portion of the cam hole 85c.

In the case of shifting-up, the shift spindle 76 is rotated clockwise in FIG. 4 (in a shift-up direction) from the neutral position, and the pin 87 is located at an inner end portion 85c1 of the cam hole 85c.

In the case of shifting-down, the shift spindle 76 is rotated counterclockwise in FIG. 4 (in a shift-down direction) from the neutral position, and the pin 87 is located at an outer end portion 85c2 of the cam hole 85c.

In the case of shifting-up, the control unit 17 rotates the shift motor 75 so as to rotate the shift spindle 76 in a shift-up direction. Attendant on the rotation of the shift spindle 76, force accumulation in the force accumulation mechanism 81 is started. When the shift spindle 76 is rotated a predetermined amount, the change clutch 61 is disengaged by rotation of the clutch lever 82. Attendant on the disengagement of the change clutch 61, the accumulated force is released, and the master arm 80 is turned to rotate the shift drum 70, whereby the gear position is shifted up by one position.

On the other hand, in the case of shifting-down, the control unit 17 rotates the shift motor 75 so as to rotate the shift spindle 76 in a shift-down direction. At the time of shifting-down, force accumulation by the force accumulation mechanism 81 is not performed. At the time of shifting-down, attendant on the rotation of the shift spindle 76, the clutch lever 82 is rotated to disengage the change clutch 61. Thereafter, the master arm 80 is turned in a shift-down direction. As a result, the shift drum 70 is rotated, and the gear position is shifted down by one position.

In the cases of shifting-up and shifting-down, the shift spindle 76 is rotated reversely after the shifting operation, whereby the master arm 80 is returned into a neutral position, and the change clutch 61 is engaged.

In the present embodiment, both the gear change mechanism 63 and the clutch operation mechanism 62 are driven by the single shift spindle 76 rotated by the single shift motor 75. Therefore, only one shift motor 75 is needed, which enables a simplified structure.

As shown in FIG. 2, a primary driven gear 90 for meshing with the primary gear 47 on the crankshaft 23 side is provided on an end of the main shaft 65 extending into the clutch chamber 34. The primary driven gear 90 is supported to be rotatable relative to the main shaft 65. The change clutch 61 is connected to the primary driven gear 90.

Figure 5:
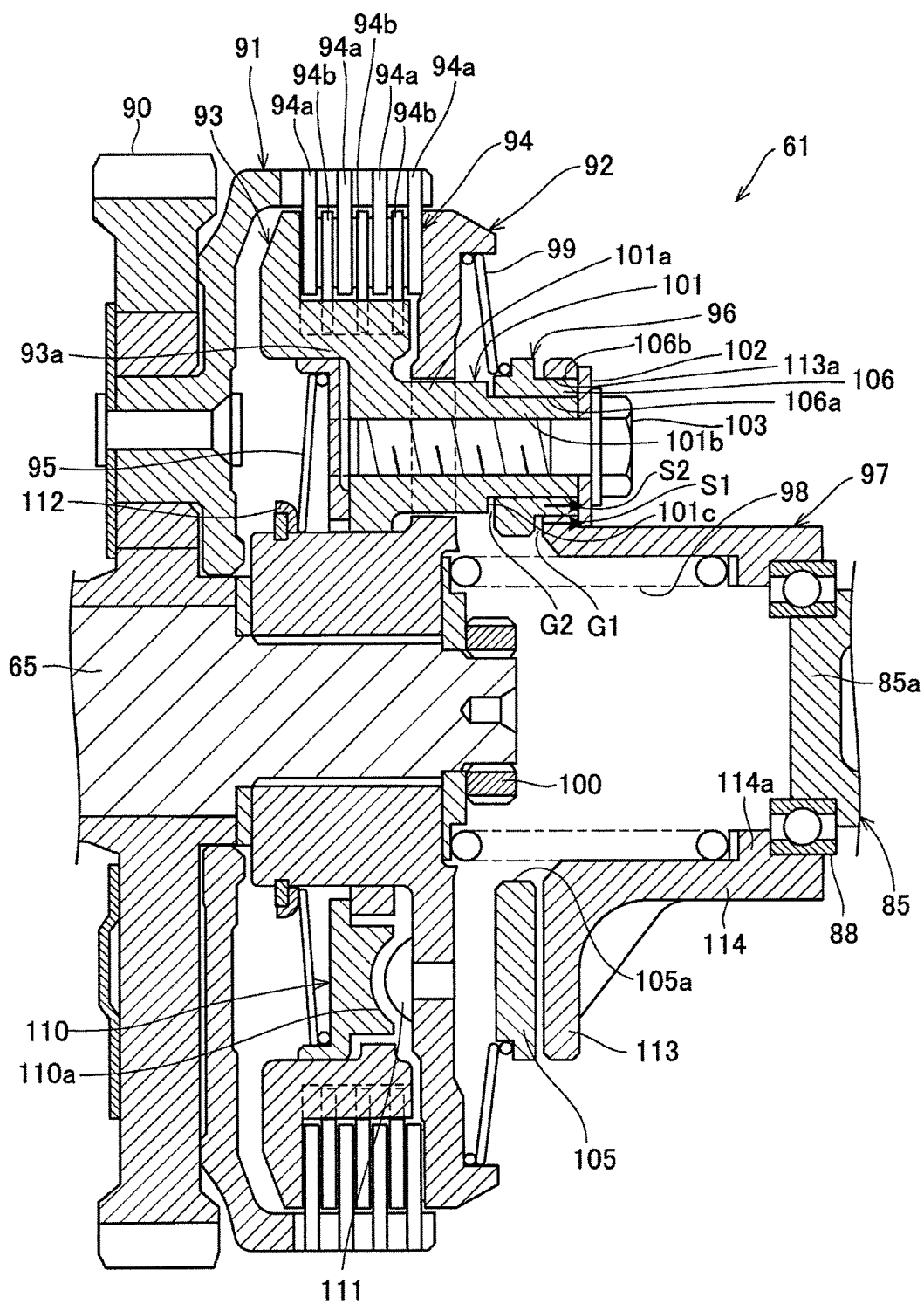
FIG. 5 is a sectional view of the change clutch.

FIG. 5 is a sectional view of the change clutch 61. FIG. 5 illustrates a state in which the change clutch 61 has been completely engaged.

The change clutch 61 includes a cup-shaped clutch outer 91 fixed to the primary driven gear 90; a disc-shaped clutch center 92 provided on a radially inner side of the clutch outer 91 and integrally fixed to the main shaft 65; a pressure plate 93 provided on a radially inner side of the clutch outer 91 and movable in the axial direction of the main shaft 65; clutch discs 94 provided between the pressure plate 93 and the clutch center 92; a main spring 95 biasing the pressure plate 93 in a clutch-engaging direction; a lifter plate 96 disposed between the clutch center 92 and the lifter cam plate 85; and a sub lifter plate 97 disposed between the lifter plate 96 and the lifter cam plate 85.

In addition, the change clutch 61 includes a sub spring 98 retained between the clutch center 92 and the sub lifter plate 97; a second sub spring 99 held between the clutch center 92 and the lifter plate 96; and a back torque limiting member 110.

The clutch center 92 and the pressure plate 93 are combined with each other to form an integral body, which constitutes a clutch inner disposed on the inside of the clutch outer 91.

The clutch outer 91 is integrally fixed onto an outside surface of the primary driven gear 90. The clutch outer 91 can be rotated relative to the main shaft 65, as one body with the primary driven gear 90.

The clutch center 92 is fixed by a nut 100 in the state of being spline-coupled to the main shaft 65. The clutch center 92 is non-rotatable and axially non-movable relative to the main shaft 65.

The pressure plate 93 is disposed on the inside of a cylindrical portion of the clutch outer 91, and is fitted to a shaft portion of the clutch center 92 so as to be movable in the axial direction. The pressure plate 93 is provided with a plurality of cylindrical release bosses 101 which penetrate the clutch center 92 and are connected to the lifter plate 96.

The clutch discs 94 are clamped between the clutch center 92 and the pressure plate 93.

The clutch discs 94 include outside frictional discs 94a provided on the clutch outer 91, and inside frictional discs 94b provided on the clutch center 92. A plurality of outside frictional discs 94a and a plurality of inside frictional discs 94b are disposed in an alternately stacked state, between the pressure plate 93 and the clutch center 92. Each of the outside frictional discs 94a is supported on the cylindrical portion of the clutch outer 91 through spline fitting, and is provided to be axially movable but non-rotatable relative to the clutch outer 91.

Each of the inside frictional discs 94b is supported on an outer circumferential portion of an inside cylindrical portion 93a of the pressure plate 93 through spline fitting, and is provided to be axially movable but non-rotatable relative to the pressure plate 93.

The back torque limiting member 110 is formed in a plate-like shape, and is fixed on the inside of the inside cylindrical portion 93a of the pressure plate 93 as one body with the pressure plate 93.

The back torque limiting member 110 and a lifter pin 111, which is fixed to the clutch center 92, constitute a back torque limiter mechanism. The back torque limiter mechanism is a known one as described, for example, in Japanese Patent Laid-Open No. 1996-93786. The back torque limiter mechanism is a mechanism which brings a clutch from an engaged state into a partial clutch engagement state in the case where a torque of not less than a predetermined value is exerted in a direction opposite to a forward power transmission direction.

The back torque limiting member 110 has a cam portion 110a which penetrates the pressure plate 93 to engage with the lifter pin 111. When a back torque of not less than a predetermined value acts from the rear wheel 13 side, the pressure plate 93 rotates relative to the clutch center 92, whereby the cam portion 110a is slid on the lifter pin 111, and the pressure plate 93 is moved in a clutch-disengaging direction. According to the back torque limiter mechanism, a shift shock arising from a back torque can be reduced.

The main spring 95 is retained between a retainer 112 provided on the clutch center 92 and the back torque limiting member 110. The main spring 95 biases the pressure plate 93 in a direction for clamping the clutch discs 94 between the pressure plate 93 and the clutch center 92, namely, in a clutch-engaging direction.

Each release boss 101 of the pressure plate 93 is provided at its tip portion with a guide shaft portion 101b formed to be smaller in diameter than a base end portion 101a. A stopper plate 102 larger in diameter than the guide shaft portion 101b is fastened to a tip surface of the guide shaft portion 101b by a bolt 103. The base end portion 101a is formed at its tip surface with a stepped portion 101c opposed to the stopper plate 102.

The lifter plate 96 includes a plate-shaped ring portion 105 opposed to the clutch center 92; a spring passing hole 105a provided in the center of the ring portion 105; and lifter plate side bosses 106 projecting from the ring portion 105 toward the lifter cam plate 85 side.

A plurality of the lifter plate side bosses 106 are formed at substantially regular intervals along the circumferential direction of the lifter plate 96. Each lifter plate side boss 106 is formed in a cylindrical shape penetrating the ring portion 105. The lifter plate side boss 106 includes a hole 106a in which the guide shaft portion 101b of the release boss 101 is inserted, and an outer circumferential portion 106b to which the sub lifter plate 97 is fitted.

The lifter plate 96 is assembled with the lifter plate side bosses 106 slidably fitted in the guide shaft portions 101b of the release bosses 101. The lifter plate 96 is disposed between the stopper plate 102 and the stepped portion 101c.

The second sub spring 99 is clamped between an outside surface of the clutch center 92 and the lifter plate 96, biasing the lifter plate 96 so as to press the lifter plate 96 against the stopper plate 102 side. In a clutch engaged state, the lifter plate 96 is disposed so that a gap G2 is formed between its ring portion 105 and the stepped portion 101c, as the tip surface of the guide shaft portion 101b is put into contact with the stopper plate 102 by a biasing force of the second sub spring 99.

In other words, the second sub spring 99 is pressing the pressure plate 93 against the clutch center 92 side through the lifter plate 96 and the stopper plate 102, thereby biasing the pressure plate 93 in a clutch-engaging direction.

The sub lifter plate 97 includes a ring-shaped pressing plate portion 113 opposed to the lifter plate 96; and a cylindrical circular pipe-shaped portion 114 projecting from an inner circumferential edge at the center of the pressing plate portion 113 toward the lifter cam plate 85 side. The circular pipe-shaped portion 114 is provided substantially coaxially with the main shaft 65.

The pressing plate portion 113 is provided with holes 113a in which to fit the lifter plate side bosses 106 of the lifter plate 96. A plurality of the holes 113a are provided at positions corresponding to the respective lifter plate side bosses 106. The ball bearing 88 is fitted to a tip portion of the circular pipe-shaped portion 114.

The sub lifter plate 97 is assembled with the holes 113a slidably fitted to the lifter plate side bosses 106 of the lifter plate 96. The pressing plate portion 113 of the sub lifter plate 97 is disposed between the stopper plate 102 and the ring portion 105 of the lifter plate 96.

The sub spring 98 is retained between the clutch center 92 and a receiving portion 114a formed at the circular pipe-shaped portion 114 of the sub lifter plate 97, biasing the sub lifter plate 97 so as to press the sub lifter plate 97 against the stopper plate 102 side.

In a clutch engaged state, the sub lifter plate 97 has its pressing plate portion 113 put in contact with the stopper plate 102 by a biasing force of the sub spring 98, with a gap G1 formed between the pressing plate portion 113 and the ring portion 105.

In other words, the sub spring 98 is pressing the pressure plate 93 against the clutch center 92 side through the stopper plate 102, thereby biasing the pressure plate 93 in a clutch-engaging direction.

In a clutch engaged state as depicted in FIG. 5, the clutch discs 94 are clamped by biasing forces of the main spring 95, the second sub spring 99 and the sub spring 98. In this state, the rotation of the clutch outer 91 rotated by the primary gear 47 can be transmitted through the clutch discs 94 to the clutch center 92, and the main shaft 94 is rotated as one body with the clutch center 92.

When the pressure plate 93 is moved toward the primary driven gear 90 side against the biasing forces of the main spring 95, the second sub spring 99 and the sub spring 98 through the lifter cam plate 85, the clamping of the clutch discs 94 is released, resulting in a clutch disengaged state.

Figure 6:
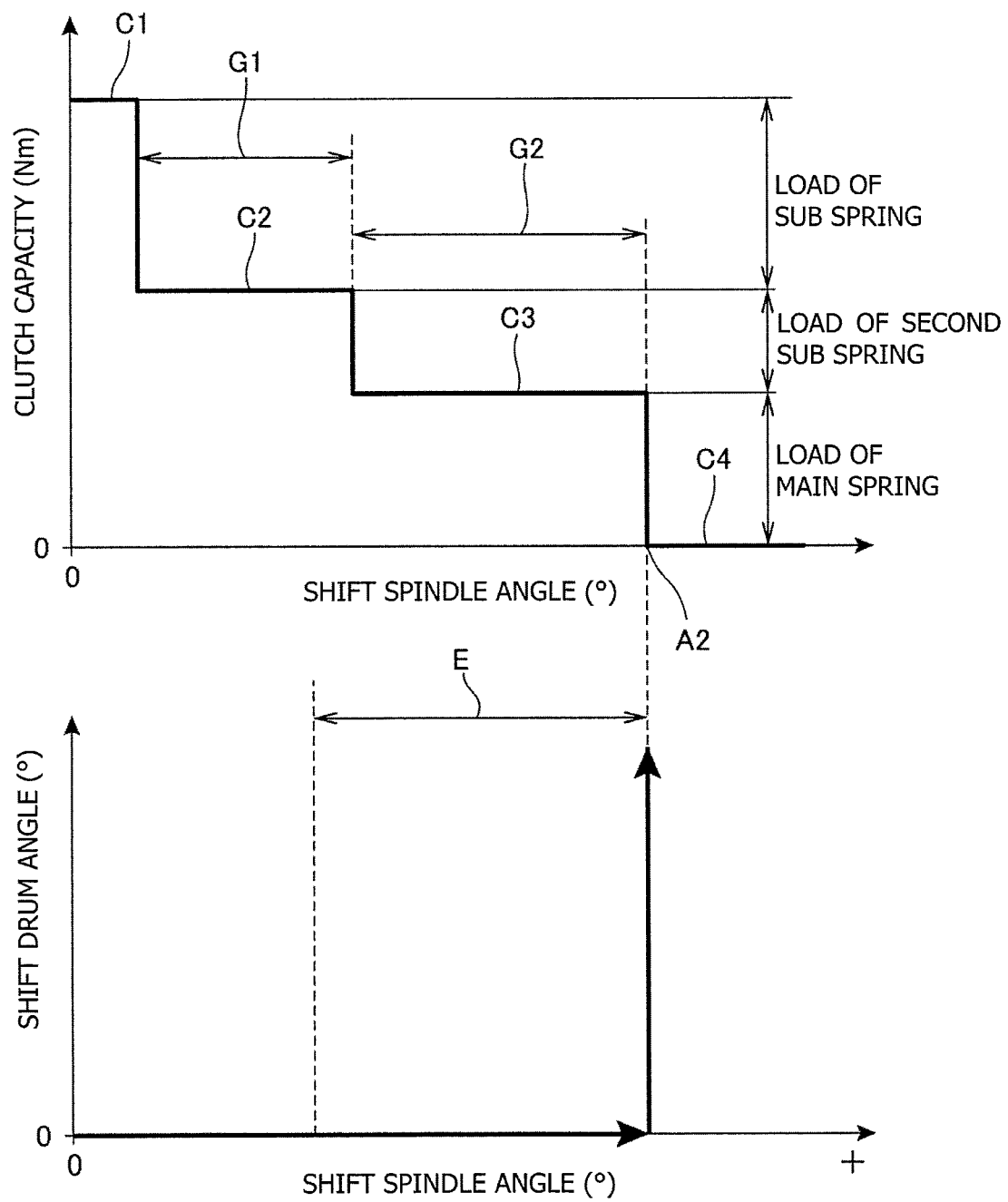
FIG. 6 is a diagram showing a clutch capacity of the change clutch and a rotational angle of a shift drum relative to a rotational angle of a shift spindle.

FIG. 6 is a diagram showing clutch capacity of the change clutch 61 and rotational angle of the shift drum 70 relative to rotational angle of the shift spindle 76. In the following description, a normal direction of rotation of the shift spindle 76 is the shift-up direction, and a negative direction of rotation of the shift spindle 76 is the shift-down direction.

As illustrated in FIG. 6, in this embodiment, the capacity of the change clutch 61 is variable as the springs contributing to the clutch capacity are changed according to the rotational angle of the shift spindle 76. More specifically, the clutch capacity is variable in a plurality of stages including: a maximum capacity C1 wherein the clutch capacity is determined by the biasing forces of the main spring 95, the second sub spring 99 and the sub spring 98; a first intermediate capacity C2 wherein the clutch capacity is determined by the biasing forces of the main spring 95 and the second sub spring 99; a second intermediate capacity C3 wherein the clutch capacity is determined by the biasing force of only the main spring 95; and a disengagement capacity C4 wherein the biasing force of the main spring 95 is completely removed.

The maximum capacity C1 of the clutch capacity is obtained in the clutch engaged state depicted in FIG. 5. In this state, both the lifter plate 96 and the sub lifter plate 97 are in contact with the stopper plate 102, so that the biasing forces of the second sub spring 99 and the sub spring 98 are transmitted to the pressure plate 93. Therefore, the biasing force with which the pressure plate 93 presses the clutch discs 94 is a sum total of the biasing forces (loads) exerted by the main spring 95, the second sub spring 99 and the sub spring 98, and is at maximum.

In other words, the sub lifter plate 97 and the stopper plate 102 constitute a first sub spring load transmission path S1 along which the biasing force of the sub spring 98 is transmitted to the pressure plate 93. In addition, the lifter plate 96 and the stopper plate 102 constitute a second sub spring load transmission path S2 along which the biasing force of the second sub spring 99 is transmitted to the pressure plate 93.

When the lifter cam plate 85 is moved in a clutch-disengaging direction attendantly on the rotation of the shift spindle 76 by the actuator mechanism 64 (FIG. 2), the sub lifter plate 97 is lifted along the lifter plate side bosses 106 toward the ring portion 105 side against the biasing force of the sub spring 98, thereby being separated from the stopper plate 102.

With the sub lifter plate 97 thus separated from the stopper plate 102, the first sub spring load transmission path S1 is interrupted, resulting in that the biasing force of the sub spring 98 is not transmitted to the pressure plate 93 any more. In this state, the clutch capacity is determined by the main spring 95 and the second sub spring 99. For this reason, as shown in FIG. 6, the clutch capacity is lowered from the maximum capacity C1 to the first intermediate capacity C2 the moment that the sub lifter plate 97 is separated from the stopper plate 102.

When the movement of the lifter cam plate 85 is continued after the sub lifter plate 97 is separated from the stopper plate 102, the sub lifter plate 97 continues moving further toward the ring portion 105 side so as to reduce the gap G1 (FIG. 5). The section from the separation of the pressing plate portion 113 of the sub lifter plate 97 from the stopper plate 102 to the contact thereof with the ring portion 105 is the section of the first intermediate capacity C2. In other words, the first intermediate capacity C2 is obtained in the section of lift amount of the lifter cam plate 85 corresponding to the magnitude of the gap G1.

In the section of the first intermediate capacity C2, the movement of the sub lifter plate 97 is a movement relative to the ring portion 105, and does not influence the loads of the main spring 95 and the second sub spring 99. For this reason, as shown in FIG. 6, in the section of the first intermediate capacity C2, the clutch capacity is determined by the main spring 95 and the second sub spring 99, and the first intermediate capacity C2 is constant. In the present embodiment, a play owing to the gap G1 is provided, so that the section in which the first intermediate capacity C2 is obtained can be elongated. Accordingly, the intermediate capacity of the clutch can be easily adjusted to a set point, without enhancing the accuracy of component parts or a control technique.

When the lifter cam plate 85 is lifted further in the clutch-disengaging direction from the state of the first intermediate capacity C2, the pressing plate portion 113 of the sub lifter plate 97 comes into contact with the ring portion 105, whereon the section of the first intermediate capacity C2 ends. Thereafter, when the lifter cam plate 85 is moved further in the clutch-disengaging direction, the lifter plate 96 is pressed through the sub lifter plate 97, and is lifted along the guide shaft portion 101b toward the stepped portion 101c side against the biasing force of the second sub spring 99, to be separated from the stopper plate 102.

With the tips of the lifter plate side bosses 106 of the lifter plate 96 separated from the stopper plate 102, the second sub spring load transmission path S2 is interrupted, resulting in that the biasing force of the second sub spring 99 is not transmitted to the pressure plate 93 any more. In this state, the clutch capacity is determined by only the main spring 95. For this reason, as shown in FIG. 6, the clutch capacity is lowered from the first intermediate capacity C2 to the second intermediate capacity C3 the moment that the lifter plate 96 is separated from the stopper plate 102.

When the movement of the lifter cam plate 85 is continued after the lifter plate 96 is separated from the stopper plate 102, the lifter plate 96 continues moving further toward the stepped portion 101c side so as to reduce the gap G2. The section from the separation of the lifter plate 96 from the stopper plate 102 to the contact thereof with the stepped portion 101c is the section of the second intermediate capacity C3. In other words, the second intermediate capacity C3 is obtained in the section of lift amount of the lifter cam plate 85 corresponding to the magnitude of the gap G2.

In the section of the second intermediate capacity C3, the movement of the lifter plate 96 is a movement relative to the stepped portion 101c, and does not influence the load of the main spring 95. For this reason, as shown in FIG. 6, in the section of the second intermediate capacity C3, the clutch capacity is determined by only the main spring 95, and the second intermediate capacity C3 is constant. In the present embodiment, a play owing to the gap G2 is provided, so that the section in which the second intermediate capacity C3 is obtained can be elongated. Accordingly, the intermediate capacity of the clutch can be easily adjusted to a set point, without enhancing the accuracy of component parts or a control technique.

When the lifter cam plate 85 is further lifted in the clutch-disengaging direction from the state of the second intermediate capacity C3, the lifter plate 96 comes into contact with the stepped portion 101c, whereon the section of the second intermediate capacity C3 ends. Thereafter, when the lifter cam plate 85 is further moved in the clutch-disengaging direction from this state, the pressure plate 93 is pressed through the sub lifter plate 97 and the lifter plate 96. As a result, the pressure plate 93 is moved in the clutch-disengaging direction, and the pressure plate 93 is separated from the clutch discs 94, whereby the clutch is disengaged.

At the time of an automatic shift, the control unit 17 selects a clutch capacity with which the shift shock can be reduced by driving the actuator mechanism 64 on the basis of the torque of the counter shaft 66. The selection of the clutch capacity can be performed by controlling the shift spindle 76 to a predetermined rotational angle. For example, at the time of shifting-up from the first speed to the second speed, the control unit 17 selects one of the maximum capacity C1, the first intermediate capacity C2 and the second intermediate capacity C3 so as to reduce the shift shock, on the basis of a pre-shift torque of the counter shaft 66 detected. Then, after changing the gear train in the transmission 60, the control unit 17 causes the change clutch 61 to be engaged at the selected clutch capacity. More specifically, the clutch capacity is selected so that the clutch capacity of the change clutch 61 will be within a band between the pre-shift torque of the counter shaft 66 and the post-shift torque of the counter shaft 66 or be at a value not deviated significantly from the band.

By this control, the rotational difference between the counter shaft 66 side and the crankshaft 23 side can be appropriately absorbed by the change clutch 61, and the shift shock can be reduced. The pre-shift and post-shift torques of the counter shaft 66 can be obtained on the basis of a map in which relationships between engine rotational speed, throttle position and the torque of the counter shaft 66 are stored.

Figure 7:
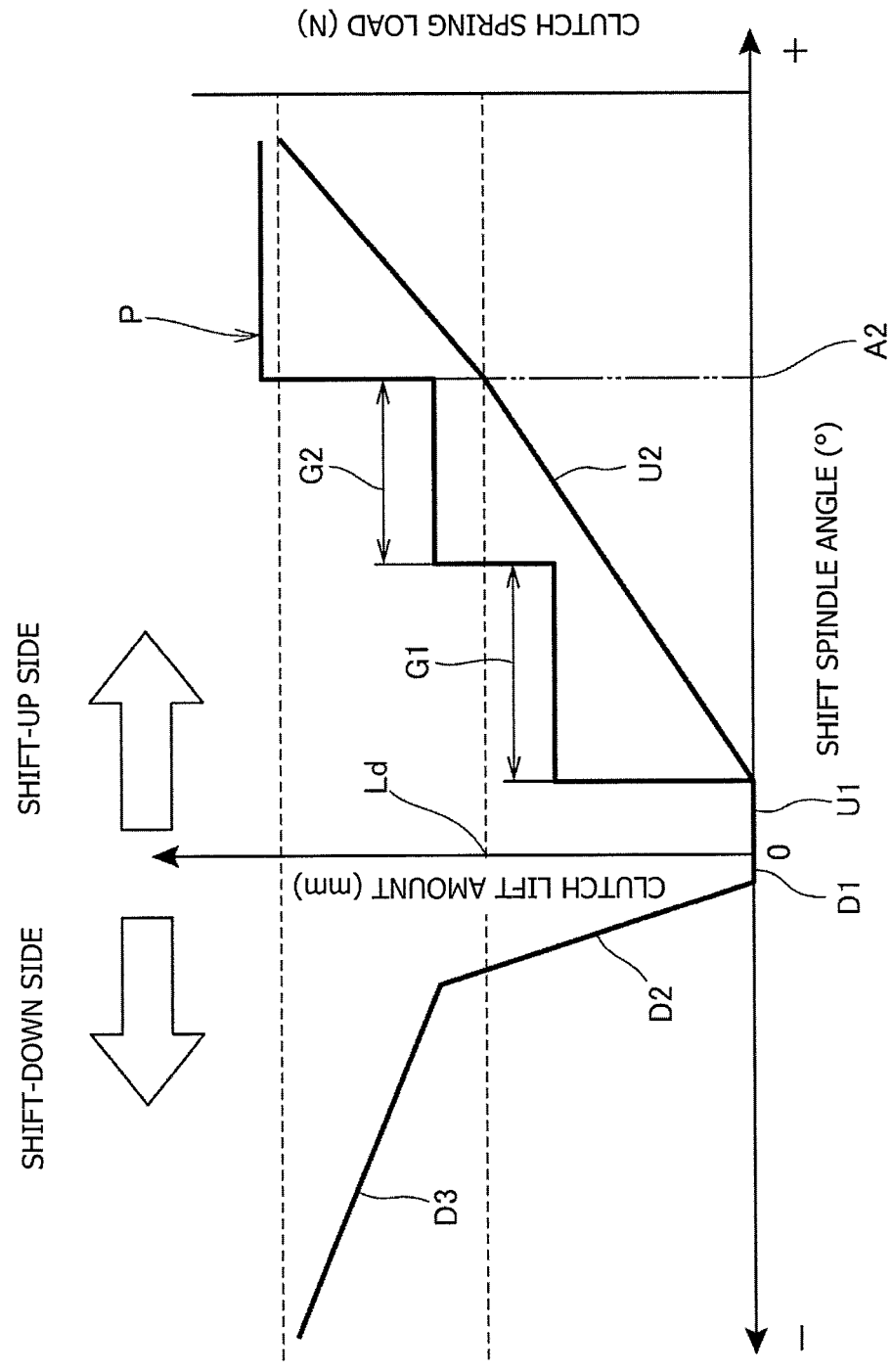
FIG. 7 is a diagram showing a lift amount of the lifter cam plate relative to the rotational angle of the shift spindle.

FIG. 7 is a diagram showing lift amount of the lifter cam plate 85 (clutch lift amount) relative to rotational angle of the shift spindle 76. In FIG. 7, on the shift-up side, the load of the clutch spring relative to the rotational angle of the shift spindle 76 is shown.

As shown in FIG. 7, lift characteristics of the lifter cam plate 85 on the shift-up side include a play section U1 wherein the lift amount does not increase in response to rotation of the shift spindle 76 from a neutral position (0°) to a predetermined angle, and a lift section U2 wherein the lift amount increases substantially linearly with an increase in the rotational amount of the shift spindle 76.

Lift characteristics of the lifter cam plate 85 on the shift-down side include a play section D1 wherein the lift amount does not increase in response to rotation of the shift spindle 76 from the neutral position (0°) to a predetermined angle, a lift section D2 wherein the lift amount increases substantially linearly with an increase in the rotational angle of the shift spindle 76, and a lift section D3 wherein the lift amount increases substantially linearly, and at a gradient smaller than that in the lift section D2, with an increase in the rotational angle of the shift spindle 76.

The play section D1 is set smaller than the play section U1. In the lift section D2, the lift amount of the lifter cam plate 85 increases at a gradient greater than that in the lift section U2.

The lift characteristics of the lifter cam plate 85 are set to desired characteristics by regulating the shapes of the cam hole 85c of the lifter cam plate 85 and the cam hole 85c of the clutch lever 82.

Load P of the clutch spring on the shift-up side shown in FIG. 7 is a reaction force that the lifter cam plate 85 receives from the change clutch 61 when the shift spindle 76 is rotated in the shift-up direction, that is, a force required for progressively disengaging the change clutch 61. Since variations in the load P correspond to variations in the clutch capacity shown in FIG. 6, the corresponding sections are denoted by the same reference symbols as used above. The load P increases stepwise correspondingly to the stepwise reduction in the clutch capacity.

A rotational position A2 reached when the shift spindle 76 is rotated slightly in the clutch-disengaging direction after the gap G2 is reduced to zero is a rotational position of the shift spindle 76 at which the clutch is disengaged. The lift amount of the lifter cam plate 85 at the rotational position A2 is a disengagement lift amount Ld at which the clutch is disengaged.

The disengagement lift amount Ld is the same in both the shift-up direction and the shift-down direction. In the lift section D2, the lift amount of the lifter cam plate 85 increases more rapidly than in the lift section U2. Therefore, in the shift-down direction, the clutch is disengaged at a smaller rotational amount of the shift spindle 76 than that in the shift-up direction.

As shown in FIG. 6, at the time of shifting-up, accumulation of a force by the force accumulation mechanism 81 is started at a stage before disengagement of the clutch. At the rotational position A2, the clutch is disengaged, whereby restraint on the change mechanism 89 by the transmission 60 is released, and the shift drum 70 is rotated at a stroke by the force accumulated in the force accumulation mechanism 81, resulting in a shift-up. A force accumulation section E in which a force is accumulated in the force accumulation mechanism 81 is the section from an intermediate position of the first intermediate capacity C2 to the rotational position A2.

Figure 8:
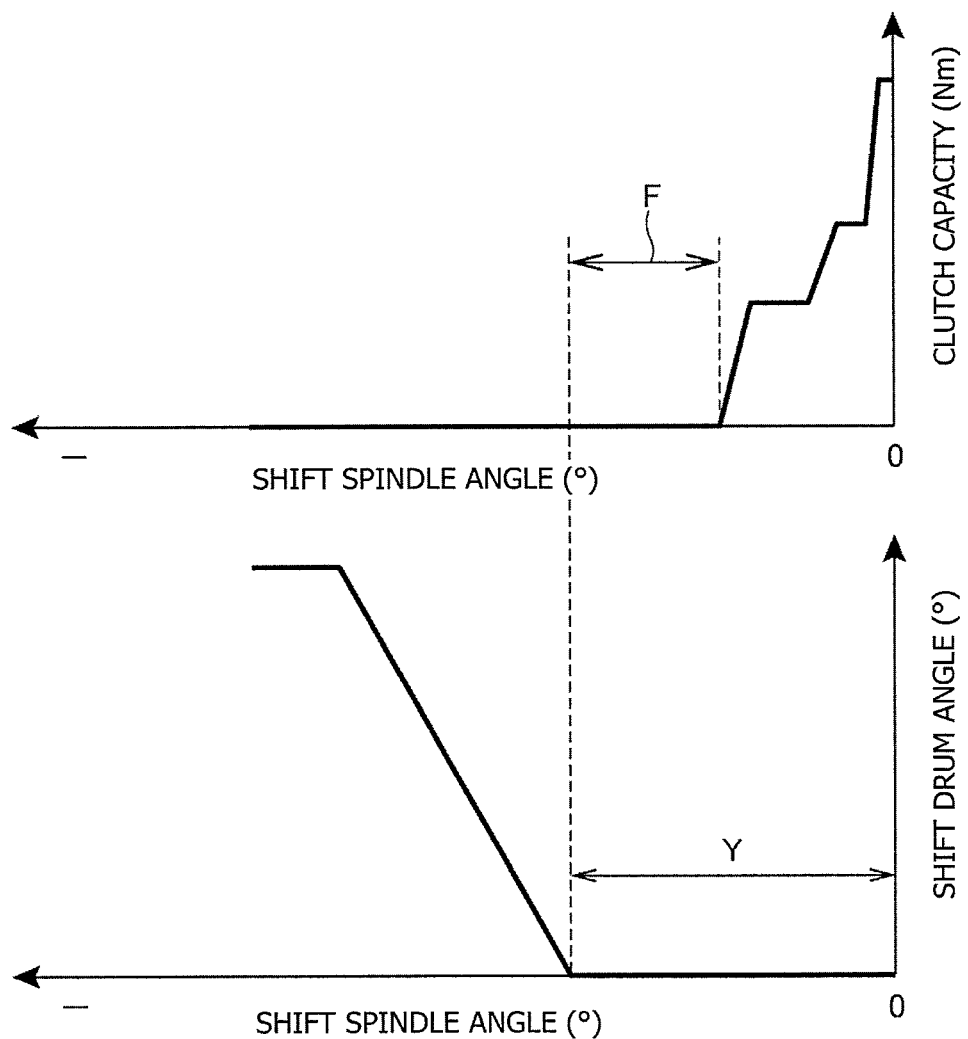
FIG. 8 is a diagram showing the clutch capacity of the change clutch and the rotational angle of the shift drum relative to the rotational angle of the shift spindle during a shift-down.

FIG. 8 is a diagram showing clutch capacity of the change clutch 61 and rotational angle of the shift drum 70 in relation to rotational angle of the shift spindle 76 at the time of shifting-down.

At the time of shifting-down, stepwise control of clutch capacity is not conducted, and, in response to rotation of the shift spindle 76, the change clutch 61 is disengaged to the disengagement capacity C4 at a stroke.

When the shift spindle 76 is rotated in the shift-down direction by a predetermined amount F after the change clutch 61 is completely disengaged, rotation of the shift drum 70 is started through the master arm 80, and a shift-down is performed.

The shift shock upon the shift-down is reduced by the back torque limiter mechanism.

Figure 9:
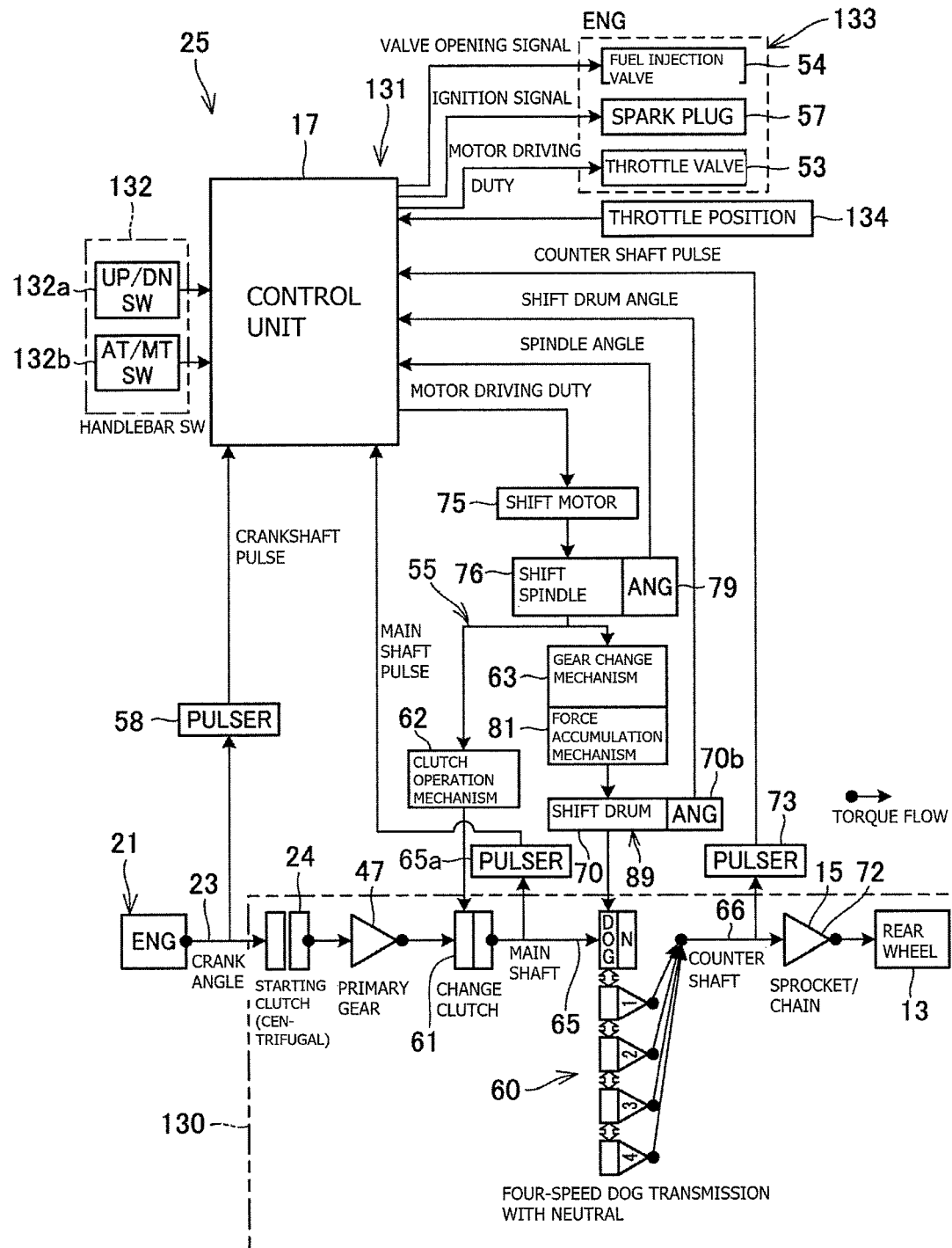
FIG. 9 is a block diagram showing the configuration of the automatic speed change apparatus.

FIG. 9 is a block diagram showing the configuration of the automatic speed change apparatus 25.

As shown in FIG. 9, the automatic speed change apparatus 25 includes a drive transmission unit 130 including the starting clutch 24, the primary gear 47, the change clutch 61, the main shaft 65, the transmission 60, the counter shaft 66, the chain 15, the sprocket 72 and the rear wheel 13; an actuator mechanical unit 55 adapted to mechanically operate the transmission 60 and the change clutch 61; an electrical unit 131; and an engine operation control unit 133 adapted to directly control the operation of the engine 21.

The drive transmission unit 130 mechanically transmits the power of the crankshaft 23 to the rear wheel 13.

The actuator mechanical unit 133 includes the shift motor 75, the shift spindle 76, the gear change mechanism 63, the force accumulation mechanism 81, the change mechanism 89, and the clutch operation mechanism 62.

The engine operation control unit 133 includes the throttle valve 53, the fuel injection valve 54, and a spark plug 57.

The throttle valve 53 is an electronically controlled one. More specifically, the throttle valve 53 is driven by a throttle valve driving motor (not shown) controlled by the control unit 17. More specifically, the control unit 17 detects, using a sensor, an operation amount of a throttle grip (not shown) provided on the handlebar 11 and operated by the driver, and drives the throttle valve driving motor according to the operation amount, thereby controlling the position (angle) of the throttle valve 53.

The spark plug 57 is connected to the control unit 17 through an ignition coil driving section and an ignition coil (both not shown).

The electrical unit 131 includes the control unit 17, an engine rotational speed sensor 58 (rotational speed sensor), the shift spindle angle sensor 79, a drum angle sensor 70b, a throttle position sensor 134, the vehicle speed sensor 73, the main shaft rotational speed sensor 65a, and a handlebar switch 132 provided on the handlebar 11.

The control unit 17 includes a CPU, and a storage section including a ROM, a RAM and the like. On the basis of control data such as a control map in the storage section, the control unit 17 controls the actuator mechanical unit 55 and the engine operation control unit 133.

The engine rotational speed sensor 58 outputs the rotational speed of the crankshaft 23 to the control unit 17.

The control unit 17 can determine the state of the transmission 60, that is, whether the transmission 60 is being shifted or not, on the basis of the value detected by the shift spindle angle sensor 79.

The drum angle sensor 70b outputs the rotational angle of the shift drum 70 to the control unit 17. On the basis of the rotational angle, the control unit 17 determines the current gear position (current shift position).

The throttle position sensor 134 outputs the position (angle) of the throttle valve 53 to the control unit 17.

The handlebar switch 132 includes the mode switch 132b and the shift selection switch 132a.

On the basis of signals from the engine rotational speed sensor 58, the shift spindle angle sensor 79, the drum angle sensor 70b, the throttle position sensor 134, and the vehicle speed sensor 73, the control unit 17 controls the shift motor 75 to automatically perform a shift operation and a clutch operation.

In addition, the control unit 17 controls the position of the throttle valve 53, the injection amount of the fuel injection valve 54, and the ignition timing of the spark plug 57, according to the operation amount of the throttle grip. In this case, the control unit 17 corrects the position of the throttle valve 53, the injection amount of the fuel injection valve 54, and the ignition timing of the spark plug 57, on the basis of values detected by the throttle position sensor 134, the engine rotational speed sensor 58, the shift spindle angle sensor 79, the drum angle sensor 70b, and the vehicle speed sensor 73.

Figure 10:
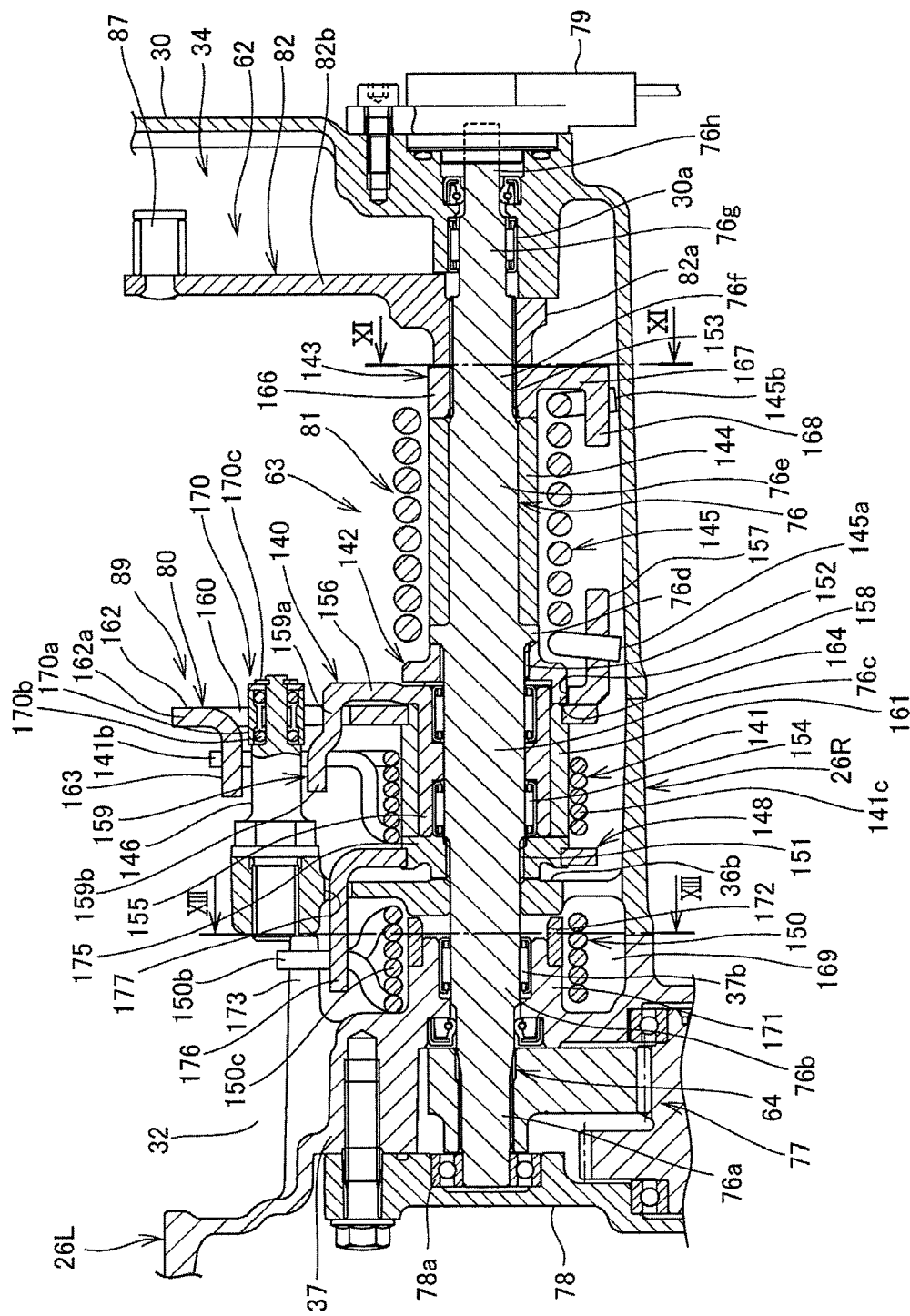
FIG. 10 is a sectional view of a force accumulation mechanism.

FIG. 10 is a sectional view of the force accumulation mechanism 81.

The wall portion 36 of the other-side case half 26R is provided, in the periphery of the shift spindle 76, with an inner wall 36b (inner wall near the faying portion) formed in the vicinity of the faying surface 26F of the crankcase 26.

The force accumulation mechanism 81 is disposed between the inner wall 36b of the wall portion 36 of the other-side case half 26R and the clutch cover 30.

The force accumulation mechanism 81 includes the shift spindle 76; a gear shift arm 140 provided on a shaft of the shift spindle 76 so as to be rotatable relative to the shift spindle 76; a return spring 141 biasing the gear shift arm 140 toward a neutral position; a shift-down collar 142 fixed on the shaft of the shift spindle 76 at a position proximate to the gear shift arm 140 and rotated as one body with the shift spindle 76; and a force accumulation collar 143 fixed on the shaft of the shift spindle 76 at a position spaced axially from the gear shift arm 140 and rotated as one body with the shift spindle 76.

In addition, the force accumulation mechanism 81 includes a spring collar 144 provided on the shaft of the shift spindle 76 between the force accumulation collar 143 and the gear shift arm 140 so as to be rotatable relative to the shift spindle 76; a force accumulation spring 145 wound around the outer circumference of the spring collar 144 between the force accumulation collar 143 and the gear shift arm 140; and a stopper pin 146 (stopper portion) adapted to restrict the rotational position of the master arm 80.

The gear change mechanism 63 includes a sub return spring locking collar 148 fixed on the shift spindle 76 adjacently to the force accumulation mechanism 81; and a sub return spring 150 connected to the sub return spring locking collar 148 and biasing the shift spindle 76 toward a neutral position.

The shift spindle 76 includes, in order from the cover 78 side a connection portion 76a connected to the speed reduction gear train 77; a support portion 76b supported by the bearing portion 37a and penetrating the inner wall 36b; a gear shift arm support portion 76c supporting the gear shift arm 140; a flange portion 76d projecting radially; a spring collar support portion 76e supporting the spring collar 144; a collar support portion 76f supporting the force accumulation collar 143; a support portion 76g supported by the bearing 30a; and a sensor connection portion 76h connected to the shift spindle angle sensor 79.

Of the shift spindle 76, the flange portion 76d is the largest in diameter, while the gear shift arm support portion 76c, the support portion 76b, and the connection portion 76a are formed to be reduced stepwise in diameter toward the side of the connection portion 76a. In addition, the spring collar support portion 76e, the collar support portion 76f, the support portion 76g, and the sensor connection portion 76h are formed to be reduced stepwise in diameter from the flange portion 76d side toward the sensor connection portion 76h.

The support portion 76b is provided with a locking collar fixing portion 151 to which the sub return spring locking collar 148 is fixed. The gear shift arm support portion 76c is provided, at a position adjacent to the flange portion 76d, with a shift-down collar fixing portion 152 to which the shift-down collar 142 is fixed. The collar support portion 76f is provided with a force accumulation collar fixing portion 153 to which the force accumulation collar 143 is fixed. The locking collar fixing portion 151, the shift-down collar fixing portion 152, and the force accumulation collar fixing portion 153 are serrations formed at an outer circumference of the shift spindle 76. In addition, the clutch lever 82 is fixed to the force accumulation collar fixing portion 153.

The sub return spring locking collar 148, the shift-down collar 142, the force accumulation collar 143, and the clutch lever 82 are fixed to be non-rotatable relative to the shift spindle 76, and are each rotated as one body with the shift spindle 76.

Figure 11:
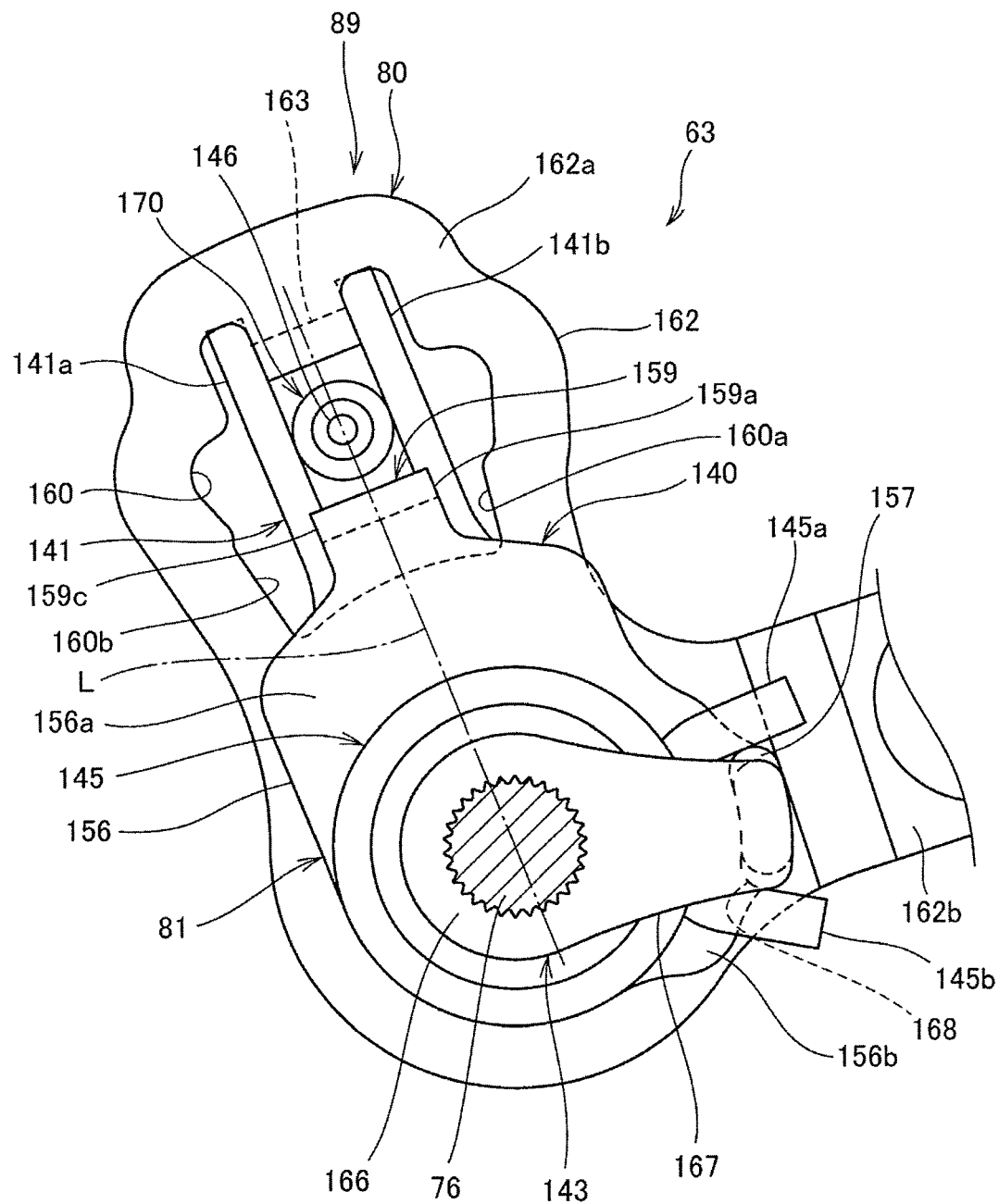
FIG. 11 is a sectional view taken along line XI-XI of FIG. 10, showing a peripheral part of the force accumulation mechanism.
Figure 12A:
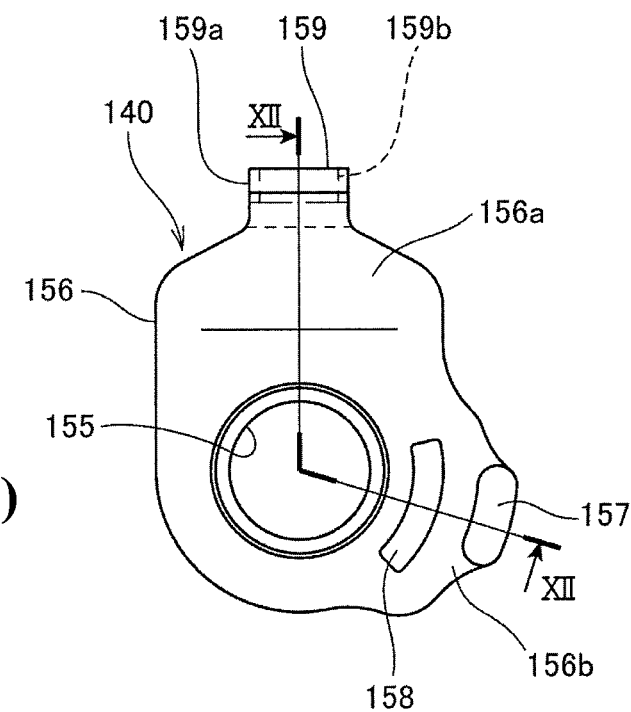
FIGS. 12(a) and 12(b) illustrate a gear shift arm, wherein 12(a) is a front view, and 12(b) is a sectional view taken along line XII-XII of 12(a)
Figure 12B:
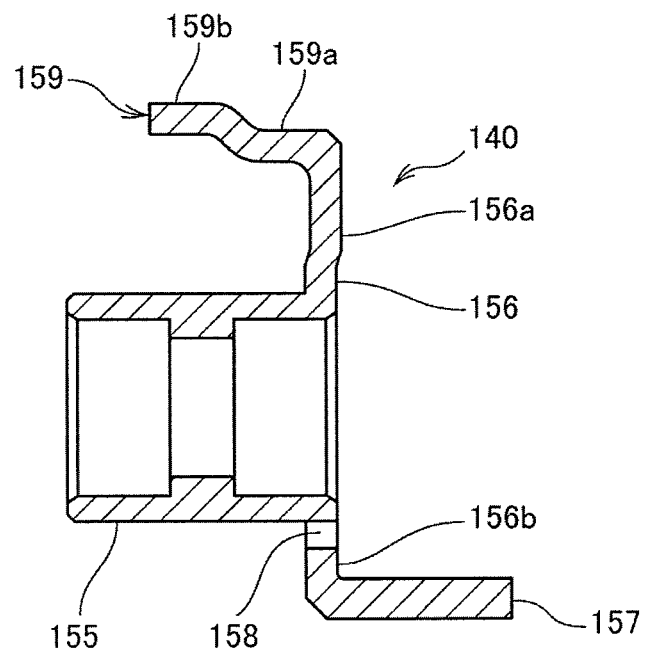

FIG. 11 is a sectional view taken along line XI-XI of FIG. 10, showing a peripheral part of the force accumulation mechanism 81. FIGS. 12(a) and 12(b) illustrate the gear shift arm 140, wherein 12(a) is a front view, and 12(b) is a sectional view taken along line XII-XII of 12(a). In FIG. 11, the actuator mechanism 64, the force accumulation mechanism 81 and the change mechanism 89 are each in a neutral state (neutral position) in which neither shifting-up nor shifting-down is being conducted. In other words, in FIG. 11, the shift spindle 76, the gear shift arm 140, the master arm 80 and the like are in their neutral state. In addition, the clutch cover 30 is not depicted in FIG. 11.

As shown in FIGS. 10 to 12(b), the gear shift arm 140 includes a cylindrical portion 155 and a plate portion 156. The cylindrical portion 155 is fitted to an outer circumferential surface of the shift spindle 76 through a bearing 154. The plate portion 156 extends radially outward from an outer circumferential portion of an end, on the force accumulation spring 115 side, of the cylindrical portion 155.

The plate portion 156 includes an upward extension portion 156a extending upward from the cylindrical portion 155; and an extension portion 156b extending from the cylindrical portion 155 in a direction substantially orthogonal to the upward extension portion 156a.

The extension portion 156b is provided with a first locking piece 157 extending substantially in parallel to the shift spindle 76 from a tip portion of the extension portion 156b toward the force accumulation spring 145 side. In addition, the plate portion 156 is provided, between the cylindrical portion 155 and the first locking piece 157, with a hole 158 in which part of the shift-down collar 142 is fitted. The hole 158 is an arc-shaped slot extending along the cylindrical portion 155.

The upward extension portion 156a is provided with a second locking piece 159 which extends radially outward from a tip portion of the upward extension portion 156a and then extends substantially in parallel to the shift spindle 76 toward the return spring 141 side.

The second locking piece 159 includes: a base end side contact portion 159a passed through a restriction opening 160 of the master arm 80; and a tip-side return spring locking portion 159b to which the return spring 141 is fixed. The return spring locking portion 159b is formed to be slenderer than the contact portion 159a.

The master arm 80 includes a cylindrical portion 161 and an arm portion 162. The cylindrical portion 161 is slidably fitted to an outer circumferential surface of the cylindrical portion 155 of the gear shift arm 140. The arm portion 162 extends radially outward from an end, on the force accumulation spring 145 side, of the cylindrical portion 161. The master arm 80 is rotatable relative to the gear shift arm 140. The master arm 80 is disposed so that the arm portion 162 is proximate to the plate portion 156 of the gear shift arm 140.

The arm portion 162 is formed in a roughly L shape in front view shown in FIG. 11. The arm portion 162 includes: a position restriction arm 162a extending upward from the cylindrical portion 161; and an operation arm 162b extending from the cylindrical portion 161 in a direction substantially orthogonal to the position restriction arm 162a. The master arm 80 is connected to the shift drum 70 through the operation arm 162b. Rotation of the master arm 80 rotates the shift drum 70.

The master arm 80 is provided, at a tip portion of the position restriction arm 162a, with the restriction opening 160 through which the stopper pin 146 is passed. The second locking piece 159 of the gear shift arm 140 is passed through the restriction opening 160, at a position downwardly of the stopper pin 146. The restriction opening 160 has a predetermined width such that the stopper pin 146 and the second locking piece 159 can be moved relative to and within the restriction opening 160.

The master arm 80 is provided, at an upper edge portion of the restriction opening 160, with a spring locking piece 163 extending substantially in parallel to the shift spindle 76 toward the return spring 141 side.

The shift-down collar 142 is formed in a cylindrical shape, is axially positioned by abutment on the flange portion 76d, and is fixed to the shift-down collar fixing portion 152. The shift-down collar 142 has a dog tooth 164 inserted in the hole 158 in the gear shift arm 140. The whole length of the dog tooth 164 is set shorter than the whole length of the hole 158 so that the dog tooth 164 can move within the hole 158.

The force accumulation collar 143 includes a cylindrical portion 166 fixed to the force accumulation collar fixing portion 153; an extension portion 167 extending radially outward from the cylindrical portion 166; and a force accumulation arm 168 extending substantially in parallel to the shift spindle 76 from the tip of the extension portion 167 toward the gear shift arm 140 side. As viewed in the axial direction of the shift spindle 76, the force accumulation arm 168 is disposed at substantially the same position, radially and circumferentially, as the first locking piece 157 of the gear shift arm 140. More specifically, the force accumulation arm 168 is provided at a position slightly deviated from the first locking piece 157 in the circumferential direction.

The spring collar 144 is disposed between the flange portion 76d and the force accumulation collar 143. The spring collar 144 rotates relative to the shift spindle 76 when the inner circumferential portion of the force accumulation spring 145 makes contact with the spring collar 144, thereby reducing the friction on the force accumulation spring 145.

The force accumulation spring 145 is a torsion coil spring. A gear shift arm side end portion 145a at one end of the force accumulation spring 145 is locked onto the first locking piece 157 of the gear shift arm 140. A force accumulation arm side end portion 145b at the other end of the force accumulation spring 145 is locked onto the force accumulation arm 168 of the force accumulation collar 143.

The return spring 141 is a torsion coil spring, a coil portion 141c of which is fitted to an outer circumferential portion of the cylindrical portion 161 of the master arm 80.

The return spring 141 has its one end 141a and other end 141b extending radially outward. The one end 141a and the other end 141b are provided to be substantially parallel to each other, with a predetermined spacing therebetween.

The return spring 141 is disposed in a state in which the stopper pin 146 is interposed between its one end 141a and its other end 141b.

In addition, the spring locking piece 163 of the master arm 80 is clamped between the one end 141a and the other end 141b, on the more tip side of the one end 141a and the other end 141b than the stopper pin 146. The second locking piece 159 of the gear shift arm 140 is retained between the one end 141a and the other end 141b, on the more base end side of the one end 141a and the other end 141b than the stopper pin 146.

The stopper pin 146 is fixed by fastening to the inner wall 36b of the other-side case half 26R. The stopper pin 146 extends substantially in parallel to the shift spindle 76, and is passed through the restriction opening 160 of the master arm 80. The stopper pin 146 is provided with a damper portion 170 at a tip portion thereof. The damper portion 170 includes a cylindrical collar 170a fitted to the stopper pin 146; an elastic member 170b such as rubber interposed between the collar 170a and the stopper pin 146; and a washer-shaped fixture 170c fitted to the tip of the stopper pin 146 so as to prevent the collar 170a from slipping off. An inner circumferential portion of the restriction opening 160 of the master arm 80 comes into contact with the damper portion 170 when the master arm 80 is rotated. Therefore, an impact sound generated when the restriction opening 160 is received by the stopper pin 146 can be reduced by the damper portion 170.

Figure 13:
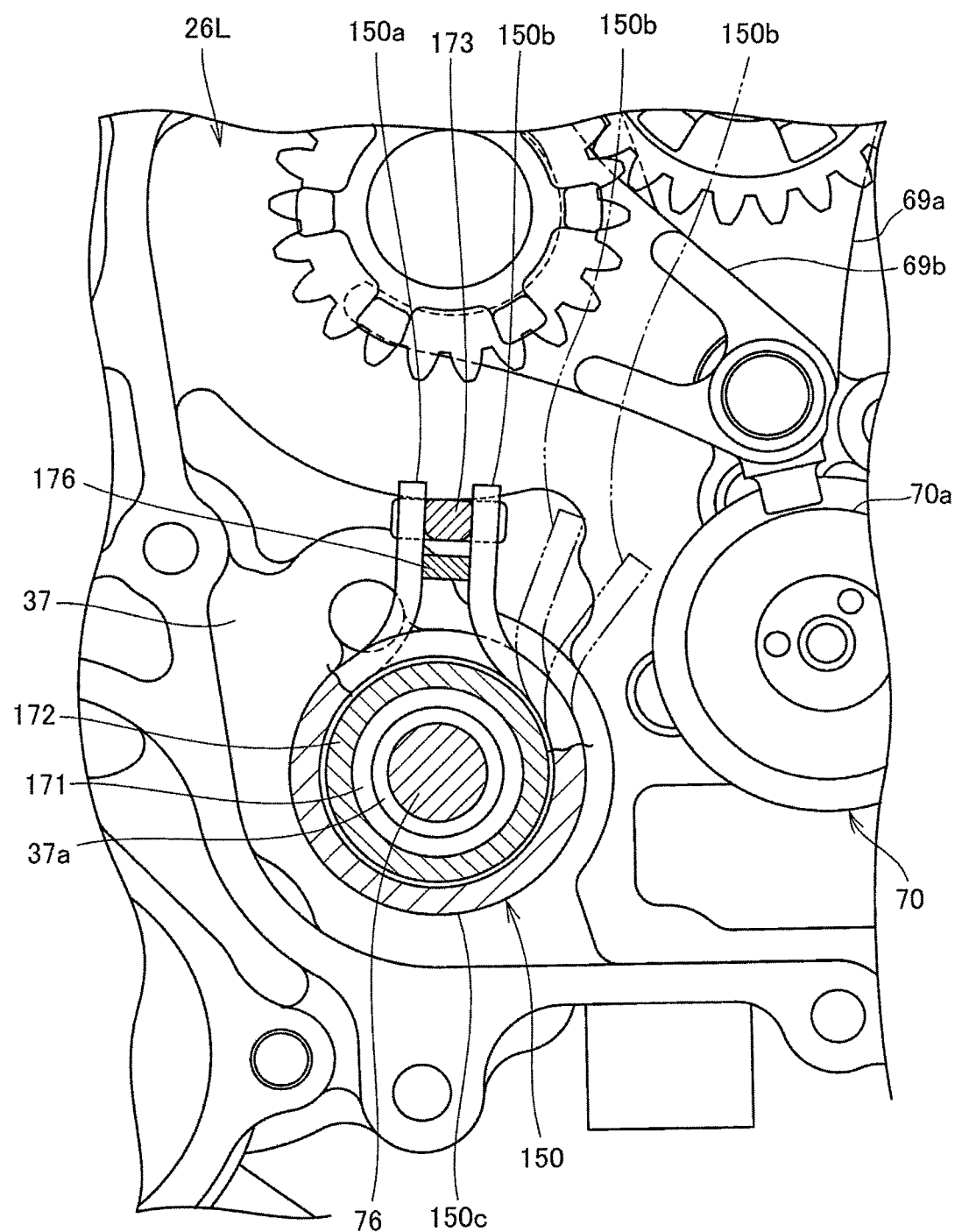
FIG. 13 is a sectional view taken along line XIII-XIII of FIG. 10.
Figure 14:
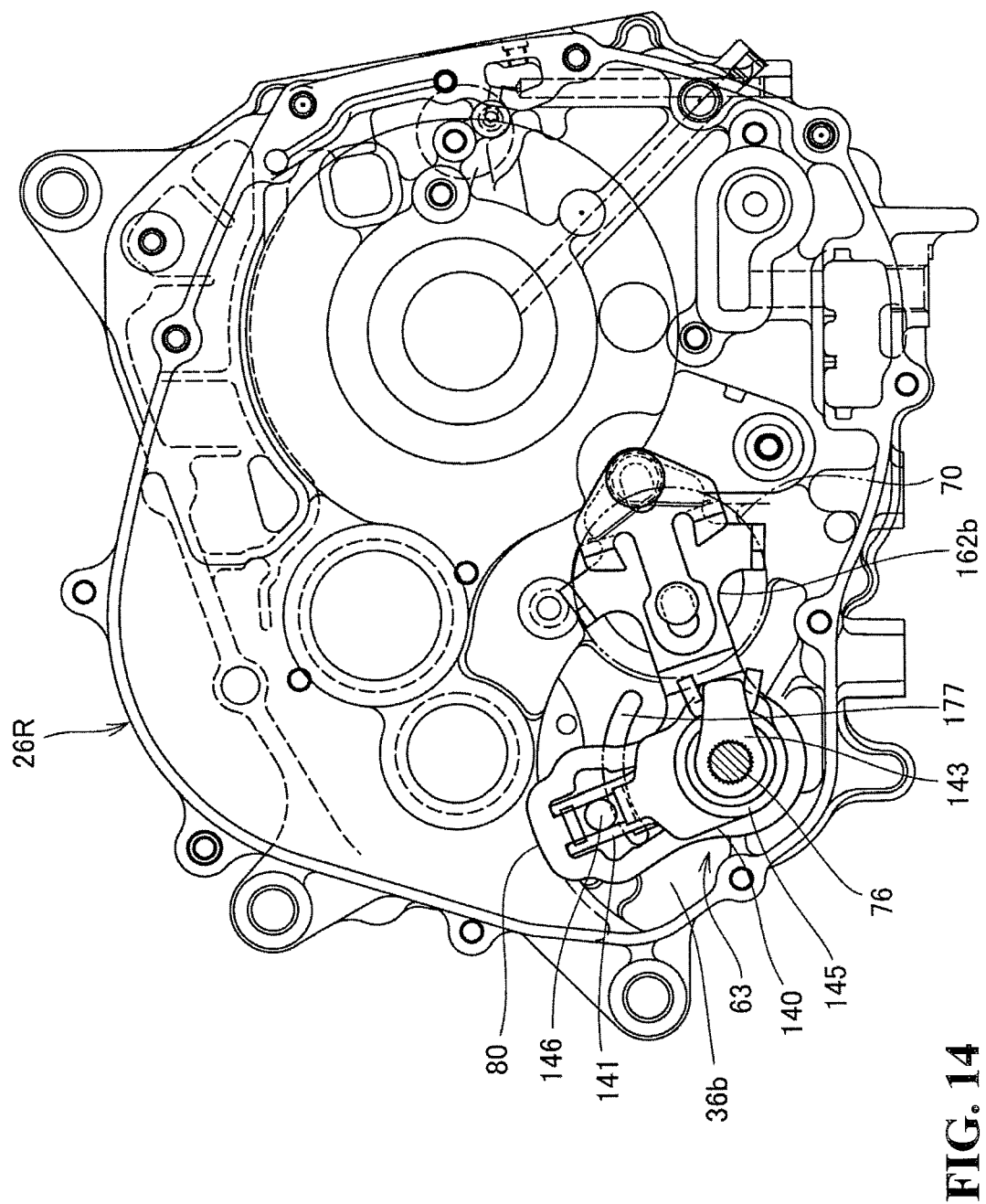
FIG. 14 is a sectional view taken along line XI-XI of FIG. 10.

FIG. 13 is a sectional view taken alone line XIII-XIII of FIG. 10. FIG. 14 is a sectional view taken along line XI-XI of FIG. 10. Here, FIG. 13 illustrates a neutral state. The clutch cover 30 is not shown in FIG. 14.

As shown in FIG. 10, the wall portion 37 of the one-side case half 26L is located on the outer side of the inner wall 36b of the other-side case half 26R. In a space 169 inside the transmission chamber 32 between the wall portion 37 and the inner wall 36b, there is provided a cylindrical sub return spring support portion 171 which projects along the shift spindle 76 from the wall portion 37 toward the inner wall 36b side. The bearing 37b supporting the shift spindle 76 is supported on an inner circumferential portion of the sub return spring support portion 171.

At the tip of the sub return spring support portion 171, there is provided a stepped portion which is hollowed in the circumferential direction. A cylindrical guide collar 172 is fixed to the stepped portion. An outer circumferential portion of the guide collar 172 and an outer circumferential portion of a base end portion of the sub return spring support portion 171 are flush with each other.

The wall portion 37 is provided, in the vicinity of the sub return spring support portion 171, with a boss 173 extending substantially in parallel to the shift spindle 76. The boss 173 and the sub return spring support portion 171 are formed to be integral with the wall portion 37, and their tip portions extend into the vicinity of the inner wall 36b.

The sub return spring 150 is a torsion coil spring. The sub return spring 150 includes a coil portion 150c, and one end 150a and the other end 150b projecting radially outward from both ends of the coil portion 150c, respectively.

The sub return spring 150 is supported by fitting of an inner circumferential portion of the coil portion 150c to an outer circumferential portion of the sub return spring support portion 171, and is disposed in the space 169.

The sub return spring 150 is disposed in a state in which the boss 173 is clamped between its one end 150a and its other end 150b. The sub return spring 150 is circumferentially positioned by the boss 173.

As illustrated in FIGS. 10 and 13, the sub return spring locking collar 148 is disposed between the inner wall 36b of the other-side case half 26R and the master arm 80, and is located inside the clutch chamber 34. In addition, the sub return spring locking collar 148 is located between the inner wall 36b and the return spring 141.

The sub return spring locking collar 148 includes a cylindrical portion 175 and an arm portion 176. The cylindrical portion 175 is fixed to the locking collar fixing portion 151 of the shift spindle 76. The arm portion 176 extends radially outward from the cylindrical portion 175, then bends to a side opposite to the return spring 141, and extends toward the sub return spring 150 side.

The inner wall 36b is provided with a hole 177 through which the arm portion 176 of the sub return spring locking collar 148 is passed. The hole 177 is formed in an arcuate shape corresponding to a rotational trajectory of the arm portion 176. The arm portion 176 is passed through the hole 177 to extend into the space 169, and is clamped between the one end 150a and the other end 150b of the sub return spring 150 at a position between the boss 173 and the coil portion 150c.

In the neutral state shown in FIG. 11, the change clutch 61 is in an engaged state, and a driving force is generated in the transmission 60. Therefore, the master arm 80 is arrested by the transmission 60 and is non-rotatable on the shift spindle 76.

In the neutral condition, the master arm 80 has its spring locking piece 163 clamped between the one end 141a and the other end 141b of the return spring 141, whereby the rotational position of the master arm 80 is restricted to a neutral position. The return spring 141 restricts the rotational position of the master arm 80 in a state in which a predetermined initial load is exerted thereon.

In the neutral state, the gear shift arm 140 has its return spring locking portion 159b clamped between the one end 141a and the other end 141b of the return spring 141, whereby the rotational position of the gear shift arm 140 is restricted to a neutral position. The return spring 141 restricts the rotational position of the gear shift arm 140 in a state in which the predetermined initial load is exerted thereon.

In other words, in the neutral condition, the master arm 80 and the gear shift arm 140 are so located as to be along a straight line L passing through the center of the shift spindle 76 and the center of the stopper pin 146.

In the neutral condition, the force accumulation spring 145 is provided in a state in which an initial bend corresponding to a predetermined torsion amount is imparted thereto between the force accumulation arm 168 and the first locking piece 157. In this state, a predetermined initial load is generated in the force accumulation spring 145.

As shown in FIG. 13, in the neutral condition, the sub return spring locking collar 148 has its arm portion 176 clamped between the one end 150a and the other end 150b of the sub return spring 150, whereby rotational position of the sub return spring locking collar 148 is restricted to a neutral position. The sub return spring 150 restricts the rotational position of the sub return spring fixing collar 148 in a state in which a predetermined initial load is exerted thereon.

FIGS. 15(a) to 15(d) illustrate positional states of the dog tooth 164 of the shift-down collar 142, wherein 15(a) shows a neutral state, and 15(b) to 15(d) show respective states of sequentially increased rotational amounts of the shift spindle 76.

Figure 15A:
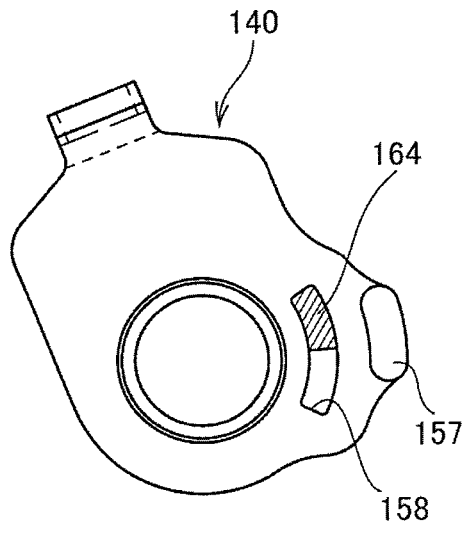
FIGS. 15(a) to 15(d) illustrate positional states of a dog tooth of a shift-down collar, wherein 15(a) shows a neutral state, and 15(b) to 15(d) show states of sequentially increased rotational amounts of the shift spindle.

As shown in FIG. 15(a), in the neutral state, the dog tooth 164 is in contact with one end of the hole 158 of the gear shift arm 140, with a gap formed between the dog tooth 164 and the other end of the hole 158.

An operation of the force accumulation mechanism 81 at the time of shifting-up will be described hereafter.

When the shift motor 75 of the actuator mechanism 64 is driven in response to a shift command from the control unit 17, rotation of the shift spindle 76 is started. The shift-up direction is the clockwise direction indicated by symbol UP in the figure.

Figure 16:
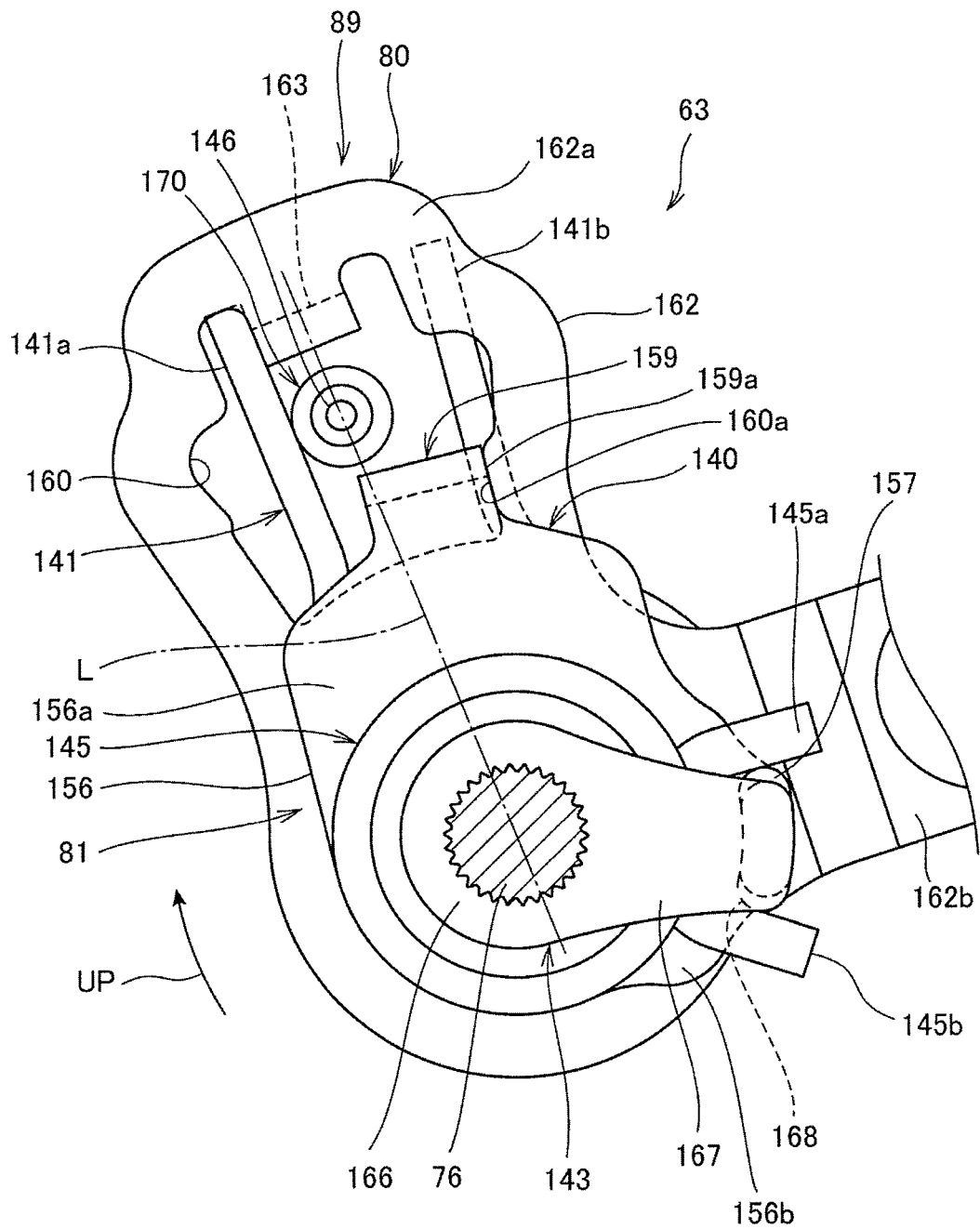
FIG. 16 illustrates a state advanced in a shift-up direction from the neutral state.

FIG. 16 illustrates a state advanced in a shift-up direction from the neutral state.

The state depicted in FIG. 16 is a state in which rotation of the shift spindle 76 has advanced to such an extent that the contact portion 159a of the second locking piece 159 of the gear shift arm 140 makes contact with an inner edge 160a of the restriction opening 160 in the master arm 80 so that the gear shift arm 140 cannot be rotated any more. In the following description, this state will be referred to as force accumulation preparatory state.

In the force accumulation preparatory state, the gear shift arm 140 has only rotated as one body with the force accumulation collar 143 through the force accumulation spring 145 attendantly on rotation of the force accumulation collar 143. Therefore, although the force accumulation mechanism 81 has rotated as a whole in a shift-up direction, bending amount of the force accumulation spring 145 has not been changed at all, and force accumulation has not been started yet. In addition, in the force accumulation preparatory state, the rotational amount of the master arm 80 from the neutral state is zero.

In the force accumulation preparatory state, the gear shift arm 140 has been rotated against a biasing force of the return spring 141, and the other end 141b of the return spring 141 is opened by a predetermined amount.

In addition, in the force accumulation preparatory state, the sub return spring locking collar 148 has been rotated against a biasing force of the sub return spring 150, and the other end 150b of the sub return spring 150 is opened by a predetermined amount, as indicated by alternate long and two short dashes line in FIG. 13.

Figure 15B:
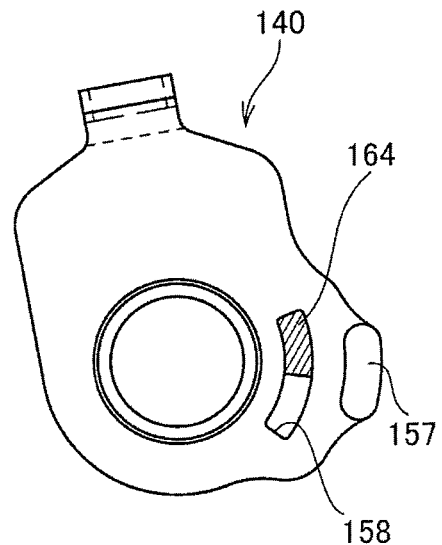

In the force accumulation preparatory state, the shift-down collar 142 is rotated as one body with the gear shift arm 140. As shown in FIG. 15(b), therefore, the dog tooth 164 is in contact with one end of the hole 158 in the gear shift arm 140, with a gap formed between the dog tooth 164 and the other end of the hole 158.

Figure 17:
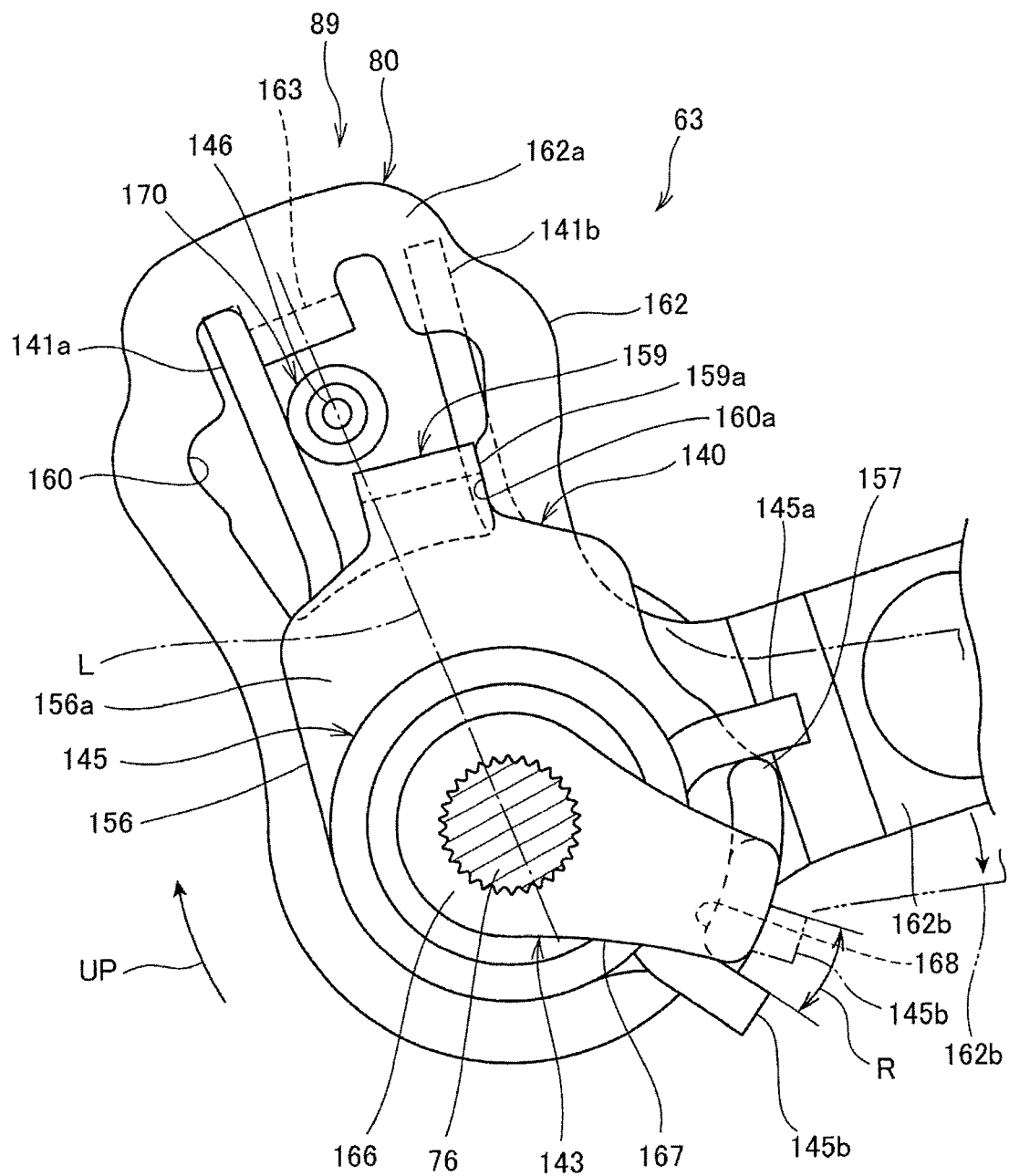
FIG. 17 illustrates a state advanced in the shift-up direction from a force accumulation preparatory state.

FIG. 17 illustrates a state advanced in the shift-up direction from the force accumulation preparatory state.

In the state depicted in FIG. 17, attendant on rotation of the shift spindle 76, only the force accumulation arm side end portion 145b of the force accumulation spring 145 has been rotated by a predetermined amount R by the force accumulation arm 168, with the gear shift arm side end portion 145a of the force accumulation spring 145 left positionally fixed by the first locking piece 157. In the following description, the state of FIG. 17 will be referred to as force accumulated state.

In the force accumulated state, the bending amount of the force accumulation spring 145 has been increased by an amount corresponding to the predetermined amount R, so that a predetermined amount of force accumulation in the force accumulation spring 145 has been completed. In addition, in the force accumulated state, the rotational amount of the master arm 80 from the neutral state is zero.

Figure 15C:
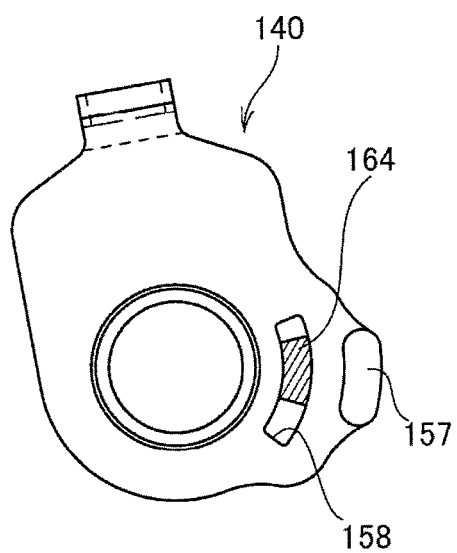

In the force accumulated state, in contrast to the gear shift arm 140 which would not be rotated because of restraint by the restriction opening 160, the shift-down collar 142 has been rotated together with the shift spindle 76. In the force accumulated state, therefore, as shown in FIG. 15(c), the dog tooth 164 is located at an intermediate position between the one end and the other end of the hole 158 in the gear shift arm 140.

In addition, in the force accumulated state, the sub return spring locking collar 148 has been rotated against the biasing force of the sub return spring 150. In this state, the other end 150b of the sub return spring 150 is opened by a further predetermined amount from the state in the force accumulation preparatory state, as indicated by alternate long and two short dashes line in FIG. 13.

Referring to FIG. 3, the clutch lever 82 is rotated as one body with the shift spindle 76. Attendant on the rotation of the clutch lever 82, the lifter cam plate 85 is moved in the axial direction, whereby the change clutch 61 is disengaged. With the change clutch 61 disengaged, restraint on the master arm 80 by the transmission 60 is canceled, so that the master arm 80 becomes rotatable. The moment the change clutch 61 is disengaged, the force accumulated in the force accumulation mechanism 81 is released, so that the master arm 80 is rotated to a position indicated by alternate long and two short dashes line in FIG. 17 at a stroke by the accumulated force through the gear shift arm 140. Therefore, a shift can be performed speedily. The master arm 80 is rotated until that portion of the restriction opening 160 which is on the one end 141a side comes into contact with the damper portion 170 of the stopper pin 146.

Figure 15D:
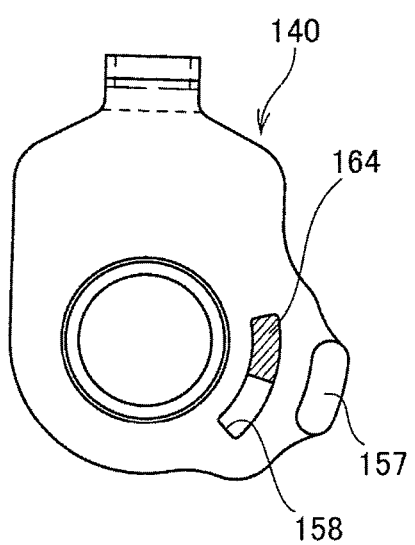

When the accumulated force is released, the gear shift arm 140 is rotated in a shift-up direction relative to the shift-down collar 142 staying at rest, resulting in that one end of the hole 158 in the gear shift arm 140 makes contact with the dog tooth 164 as shown in FIG. 15(d). Therefore, when rotating the shift spindle 76 in the shift-down direction opposite to the shift-up direction, the gear shift arm 140 can be rapidly rotated in the shift-down direction through the dog tooth 164. Consequently, returning into the neutral state can be achieved speedily.

At the time of shifting-down, first, the gear shift arm 140 is progressively rotated in the shift-down direction from the neutral state shown in FIG. 11, and a contact portion 159c of the gear shift arm 140 comes into contact with an inner edge 160b of the restriction opening 160 of the master arm 80. The section from the neutral state to the contact of the contact portion 159c with the inner edge 160b corresponds to section Y in FIG. 8. In the section Y, the change clutch 61 is disengaged attendantly on the rotation of the shift spindle 76, but the shift drum 70 is not yet rotated. When the shift spindle 76 is rotated in the shift-down direction beyond the section Y, the master arm 80 is rotated in the shift-down direction through the contact portion 159c, and the shift drum 70 is rotated, to carry out a shift-down.

Figure 18:
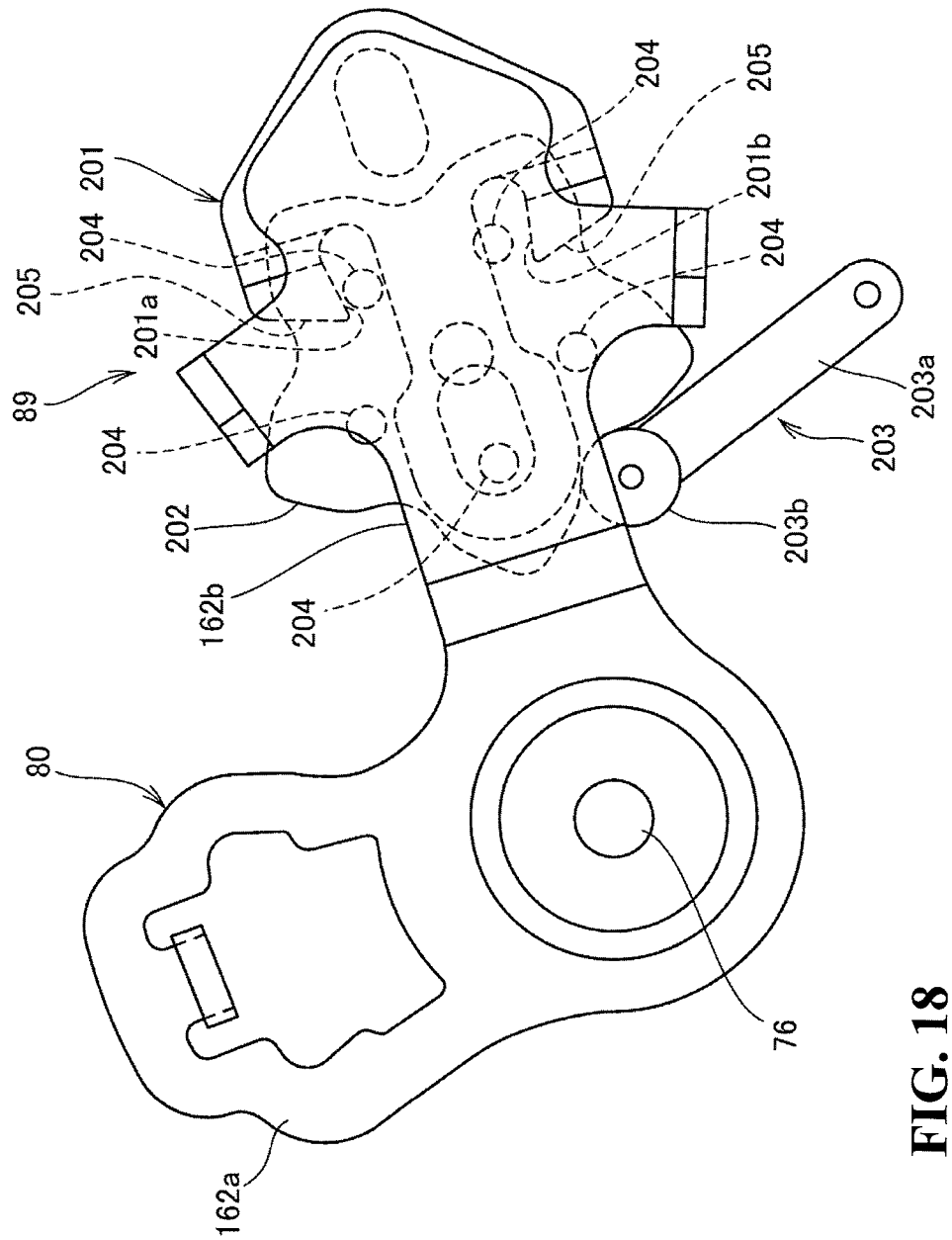
FIG. 18 is a side view of a change mechanism.
Figure 19A:
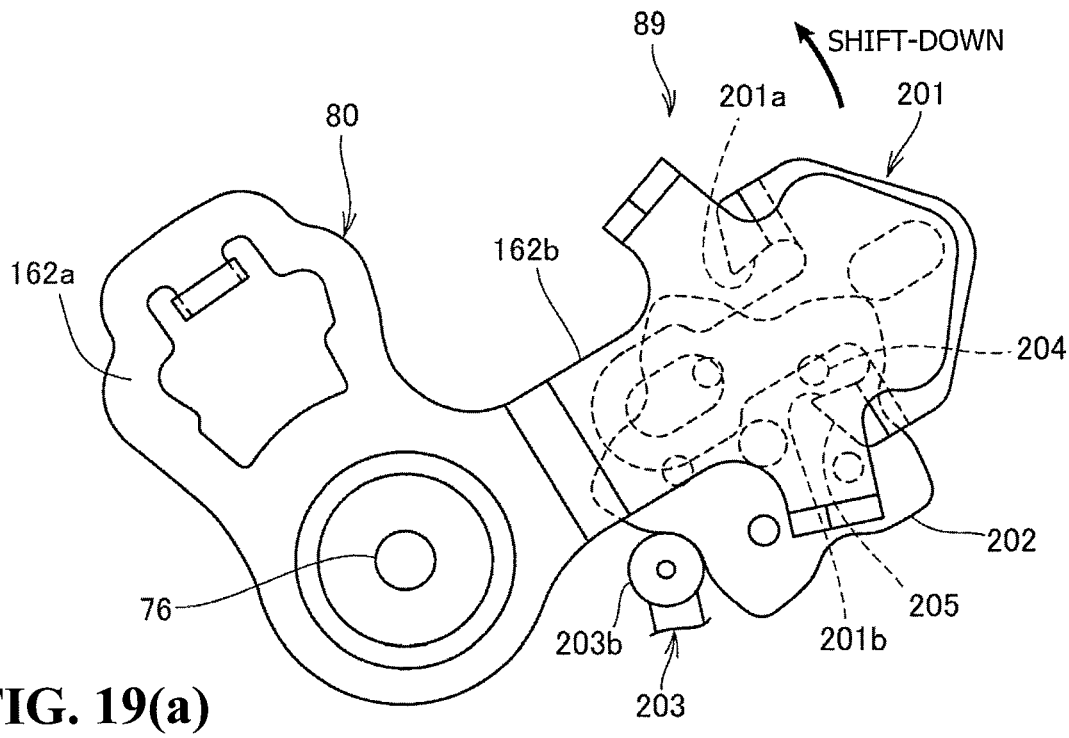
FIGS. 19(a) and 19(b) illustrate operating states of the change mechanism, wherein 19(a) shows a state upon completion of normal feeding in a shift-down direction, and 19(b) shows a state of returning toward a neutral position side from the state of 19(a)
Figure 19B:
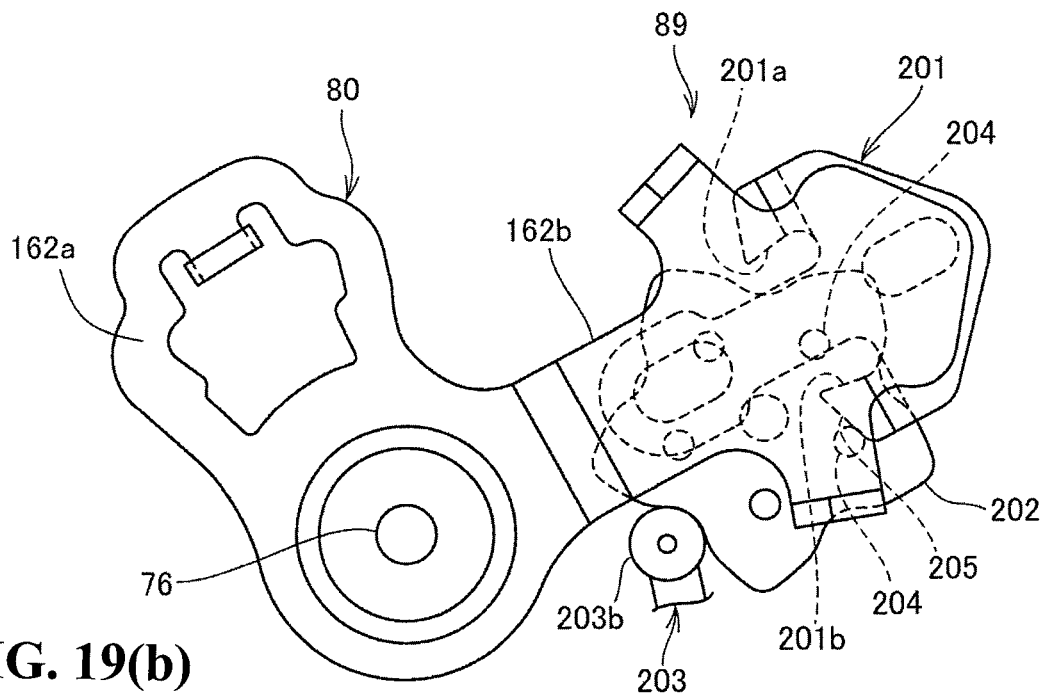

FIG. 18 is a side view of the change mechanism 89. FIGS. 19(a) and 19(b) illustrate operating states of the change mechanism 89, wherein 19(a) shows a state upon completion of normal feeding in a shift-down direction, and 19(b) shows a state of returning toward a neutral position side from the state of 19(a).

The change mechanism 89 includes a feeding operation member 201 provided at a tip portion of the master arm 80; a star-shaped plate 202 provided at a shaft end of the shift drum 70 (FIG. 14); and a stopper arm 203 (biasing member) making contact with an outer circumferential portion of the star-shaped plate 202 to restrict rotational position of the star-shaped plate 202.

The star-shaped plate 202 includes a plurality (five) of cam ridges projecting radially at positions at substantially regular intervals along the circumferential direction, and a plurality (five) of locking pins 204 projecting in the axial direction from outside surfaces of the cam ridges, respectively. The star-shaped plate 202 is provided to be integral with the shift drum 70. The shift drum 70 is rotated by a process in which the locking pin 204 is pressed by the feeding operation member 201.

The stopper arm 203 includes an arm portion 203a rotatably supported on the crankcase 26, and a roller 203b rotatably supported on a tip portion of the arm portion 203a. The arm portion 203a is biased by a spring (not shown), which is connected to the arm portion 203a, so that the roller 203b constantly stays in contact with an outer circumferential portion of the star-shaped plate 202. In other words, when the shift drum 70 rotates, the roller 203b moves along the cam ridges and cam valleys between the cam ridges of the star-shaped plate 202.

The feeding operation member 201 is slidable in a longitudinal direction of the operation arm 162b of the master arm 80, and is biased by a spring or the like (not shown) so as to move toward the shift spindle 76 side.

The feeding operation member 201 is provided on the tip side thereof with a shift-up pressing portion 201a and a shift-down pressing portion 201b which project in the axial direction of the shift drum 70 toward the locking pin 204 side.

FIG. 18 illustrates a neutral state of the change mechanism 89. In this state, the roller 203b is in engagement with a valley portion of the star-shaped plate 202, whereby the shift drum 70 is positioned at a rotational angle corresponding to a predetermined gear position. In addition, in the neutral state, the shift-up pressing portion 201a and the shift-down pressing portion 201b are located at respective positions slightly spaced to the outer sides from the two adjacent locking pins 204, 204.

When the master arm 80 is rotated in a shift-down direction in response to a shift-down command, the shift-down pressing portion 201b comes into contact with one locking pin 204 from below, and rotates the shift drum 70 in a shift-down direction through the locking pin 204. In this case, the shift-down pressing portion 201b rotates the shift drum 70 against a biasing force of the stopper arm 203. More specifically, the shift-down pressing portion 201b rotates the shift drum 70 against the biasing force of the stopper arm 203, until the roller 203b comes beyond the cam ridge of the star-shaped plate 202. After the roller 203b has come beyond the cam ridge of the star-shaped plate 202, a pressing force at the time of the roller 203b coming down toward the valley portion side causes the shift drum 70 to automatically rotate until the roller 203b comes into engagement with the valley portion. In other words, if the shift drum 70 is rotated to such a position that the roller 203b comes beyond the cam ridge of the star-shaped plate 202, the shift drum 70 automatically rotates to a position corresponding to the next shift position even after the shift-down pressing portion 201b is separated from the locking pin 204. Therefore, in a state in which the master arm 80 has been completely fed in the shift-down direction, as shown in FIG. 19(a), the shift-down pressing portion 201b is separate from the locking pin 204. In other words, if the shift drum 70 is rotated to such a position that the roller 203b comes beyond the cam ridge of the star-shaped plate 202, the master arm 80 is rotatable also in the opposite direction, independently from the shift drum 70.

At the time of returning from the state of FIG. 19(a) to the neutral state of FIG. 18, the master arm 80 is rotated in a shift-up direction. In this case, the feeding operation member 201 is moved in the longitudinal direction of the operation arm 162b by a process in which its returning contact portion 205 provided in the vicinity of its shift-down pressing portion 201b rotates while making contact with the other locking pin 204, as shown in FIG. 19(b). Upon complete returning to the neutral position, the state of FIG. 18 is established.

While the case of shifting-down has been described here, a shifting-up process includes pressing of the locking pin 204 by the shift-up pressing portion 201a, which causes the shift drum 70 to be rotated in a shift-up direction.

During the period after the assembly of the motorcycle 10 is completed and before the first running of the motorcycle 10, a shift-down side clutch-disengaging position learning process is carried out only once. In this learning process, a rotational position (rotational angle) of the shift spindle 76 at which the change clutch 61 is disengaged at the time of shifting-down is learnt.

Figure 20:
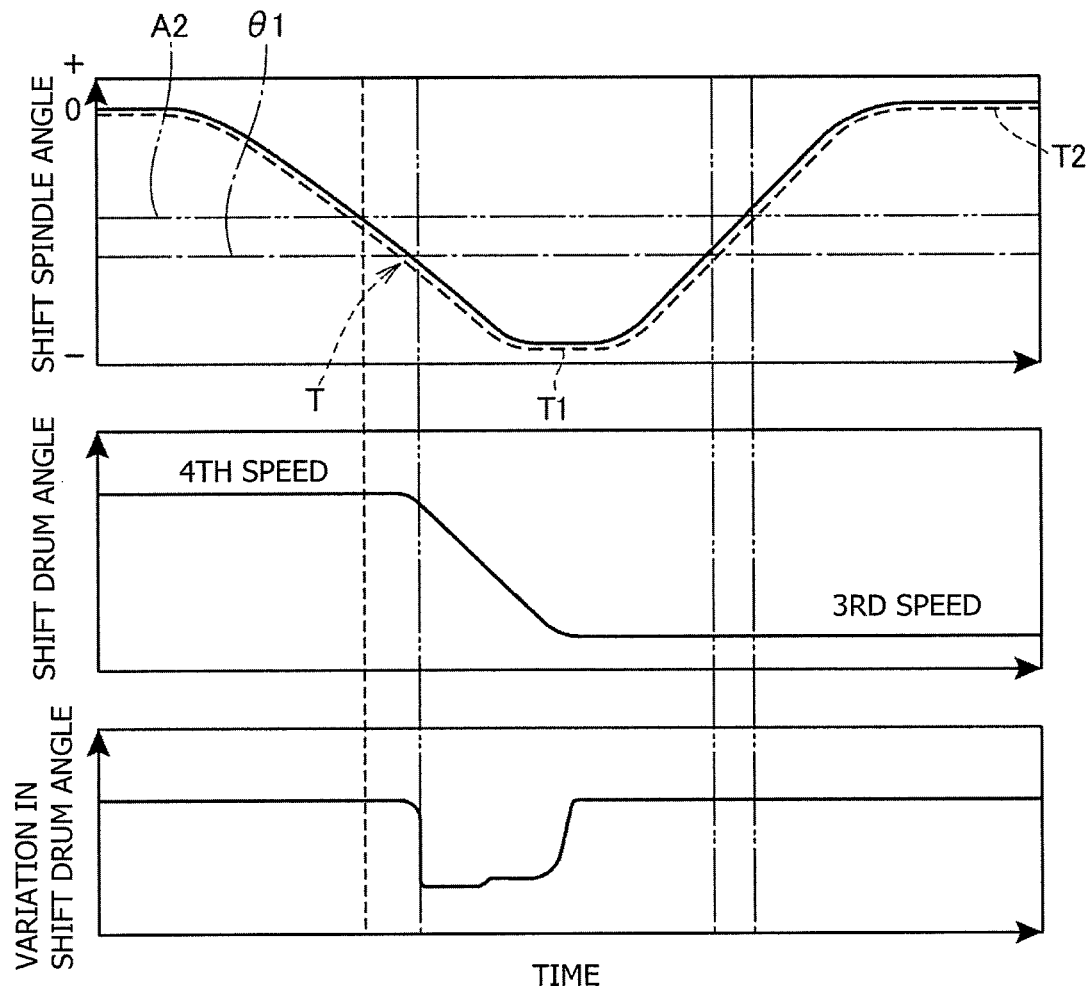
FIG. 20 shows time charts of operations of the automatic speed change apparatus in a shift-down side clutch-disengaging position learning process.
Figure 21:
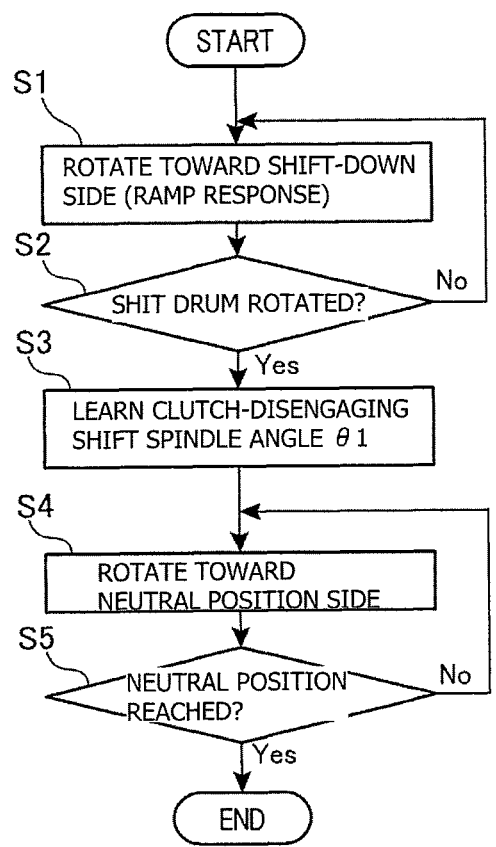
FIG. 21 is a flow chart of the shift-down side clutch-disengaging position learning process.

FIG. 20 shows time charts of an operation of the automatic speed change apparatus 25 in the shift-down side clutch-disengaging position learning process. FIG. 21 is a flow chart of the shift-down side clutch-disengaging position learning process. In the following description, the magnitude of an angle will be indicated by an absolute value.

In FIG. 20, time is taken on the axis of abscissas, while the angle of the shift spindle 76, the angle of the shift drum 70, and variation in the angle of the shift drum 70 per unit time are taken on the axis of ordinates.

In a time chart representing the angle of the shift spindle 76 in FIG. 20, a learning target angle pattern T for the angle of the shift spindle 76 is also shown. The control unit 17 drives the shift motor 75 so that the angle of the shift spindle 76 follows up to the learning target angle pattern T. Since the angle of the shift spindle 76 varies in substantial agreement with the learning target angle pattern T, a line indicative of the angle of the shift spindle 76 and the learning target angle pattern T just overlap with each other in practice. In FIG. 20, however, the learning target angle pattern T is shown slightly shifted from its original pattern, for enhancing visibility or understandability thereof.

The learning target angle pattern T has a disengaging-side target angle T1 and a returning-side target angle T2. The disengaging-side target angle T1 is an angle at which the angle of the shift spindle 76 is the greatest in the shift-down side clutch-disengaging position learning process. The returning-side target angle T2 is a target angle on the clutch-engaging side in returning the shift spindle 76 to a neutral position (0°).

The direction of rotation of the shift spindle 76 from the neutral position toward the disengaging-side target angle T1 side is a disengaging direction (first direction) for causing the change clutch 61 to be disengaged attendantly on the rotation. The direction of rotation of the shift spindle 76 from the disengaging-side target angle T1 toward the neutral position side is a return direction (second direction) for causing the change clutch 61 to be engaged attendantly on the rotation.

The disengaging-side target angle T1 is set at an angle greater than a rotational position A2 of the shift spindle 76 at which the change clutch 61 is disengaged completely. For this reason, in the disengaging direction, the change clutch 61 is disengaged before the shift spindle 76 reaches the disengaging-side target angle T1.

In the shift-down side clutch-disengaging position leaning process, first, the control unit 17 sets a disengaging-side target angle T1, and drives the shift motor 75 so that the angle of the shift spindle 76 will become equal to the disengaging-side target angle T1 (step S1). In step S1, during a section from the neutral position to the disengaging-side target angle T1, the leaning target angle pattern T is a ramp input such that the target angle increases at a substantially constant rate. Therefore, a rotating operation of the shift spindle 76 in step S1 is a ramp response such that the rotational angle increases at a substantially constant rate (for example, 10°/second).

In step S1, attendant on the rotation of the shift spindle 76, the change clutch 61 is first disengaged, and thereafter the shift drum 70 starts rotating.

The control unit 17 determines whether or not the shift drum 70 has started rotating, on the basis of a value detected by the drum angle sensor 70b (step S2). If the shift drum 70 has not yet started rotating (step S2: No), the control process returns to step S1, to continue the rotation of the shift spindle 76. The control unit 17 determines that the shift drum 70 has started rotating, if, for example, the variation in the angle of the shift drum 70 per unit time has reached a predetermined value.

If the shift drum 70 has started rotating (step S2: Yes), the control unit 17 learns (stores) the rotational position of the shift spindle 76 at which the shift drum 70 has started rotating, as a clutch-disengaging shift spindle angle θ1 at which the change clutch 61 is disengaged (step S3). The clutch-disengaging shift spindle angle θ1 is stored in an EEPROM (nonvolatile memory) of the control unit 17.

A play rotation section for the shift spindle 76 is provided during a period from the time when the change clutch 61 is disengaged to the time when the shift drum 70 starts rotating. Therefore, the clutch-disengaging shift spindle angle θ1 is slightly greater than the rotational position A2.

Next, when the angle of the shift spindle 76 has reached the disengaging-side target angle T1, the control unit 17 sets a returning-side target angle T2, and drives the shift motor 75 so as to return the shift spindle 76 toward the neutral position side (step S4).

Subsequently, the control unit 17 determines whether or not the shift spindle 76 has reached the neutral position (step S5). If the shift spindle 76 has not yet reached the neutral position (step S5: No), the control unit 17 continues driving the shift motor 75. If the shift spindle 76 has reached the neutral position (step S5: Yes), the control unit 17 finishes the shift-down side clutch-disengaging position learning process.

The automatic speed change apparatus 25 is structured so that the change clutch 61 has already been disengaged at the rotational position A2 at the time when the shift drum 70 starts rotating toward the next shift position. Therefore, the rotational angle of the shift spindle 76 corresponding to the rotational angle at the start of rotation of the shift drum 70 can be regarded as a clutch-disengaging shift spindle angle θ1, whereby the clutch-disengaging shift spindle angle θ1 can be easily set. It is necessary for the clutch-disengaging shift spindle angle θ1 to only be determined on the basis of the rotational angle θs (not shown) of the shift spindle 76 corresponding to the rotational angle at the start of rotation of the shift drum 70. Thus, the clutch-disengaging shift spindle angle θ1 may be set equal to the rotational angle θs or may be set to within a range of several degrees around the rotational angle θs.

In addition, the clutch-disengaging shift spindle angle θ1 is determined after completion of assembly of the motorcycle 10. For this reason, the clutch-disengaging shift spindle angle θ1 can be determined in a condition where dimensional errors of component parts and the like are reflected. Accordingly, the position at which the change clutch 61 is disengaged can be accurately stored in the control unit 17.

The control unit 17 learns the clutch-disengaging shift spindle angle θ1 through detection of the rotation of the shift spindle 76 and the shift drum 70 which are rotated at substantially constant rates according to the ramp response. Therefore, the clutch-disengaging shift spindle angle θ1 can be accurately determined, on the basis of the rotation of the shift spindle 76 and the shift drum 70 being rotated more slowly than at the time of a normal shift during the operation of the motorcycle 10.

Figure 22:
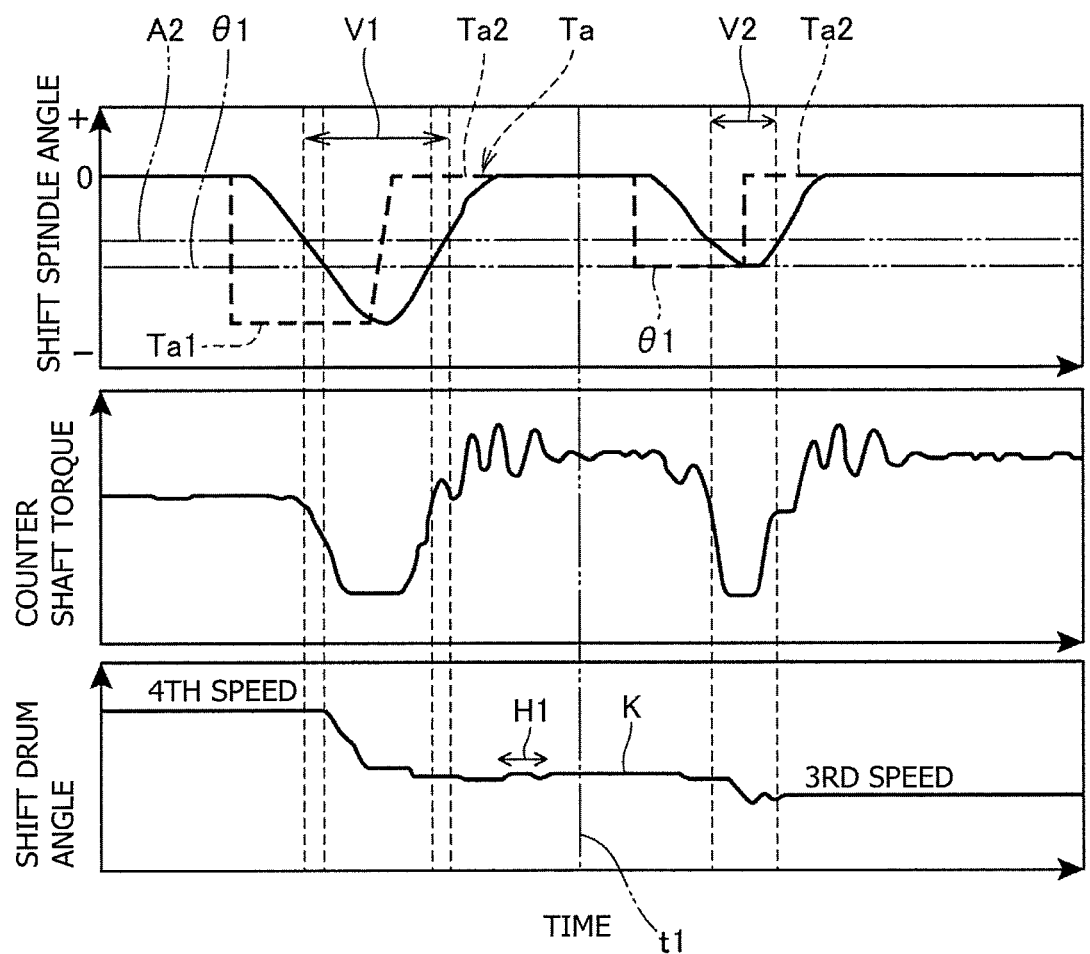
FIG. 22 shows time charts of operations of the automatic speed change apparatus during a shift-down.
Figure 23:
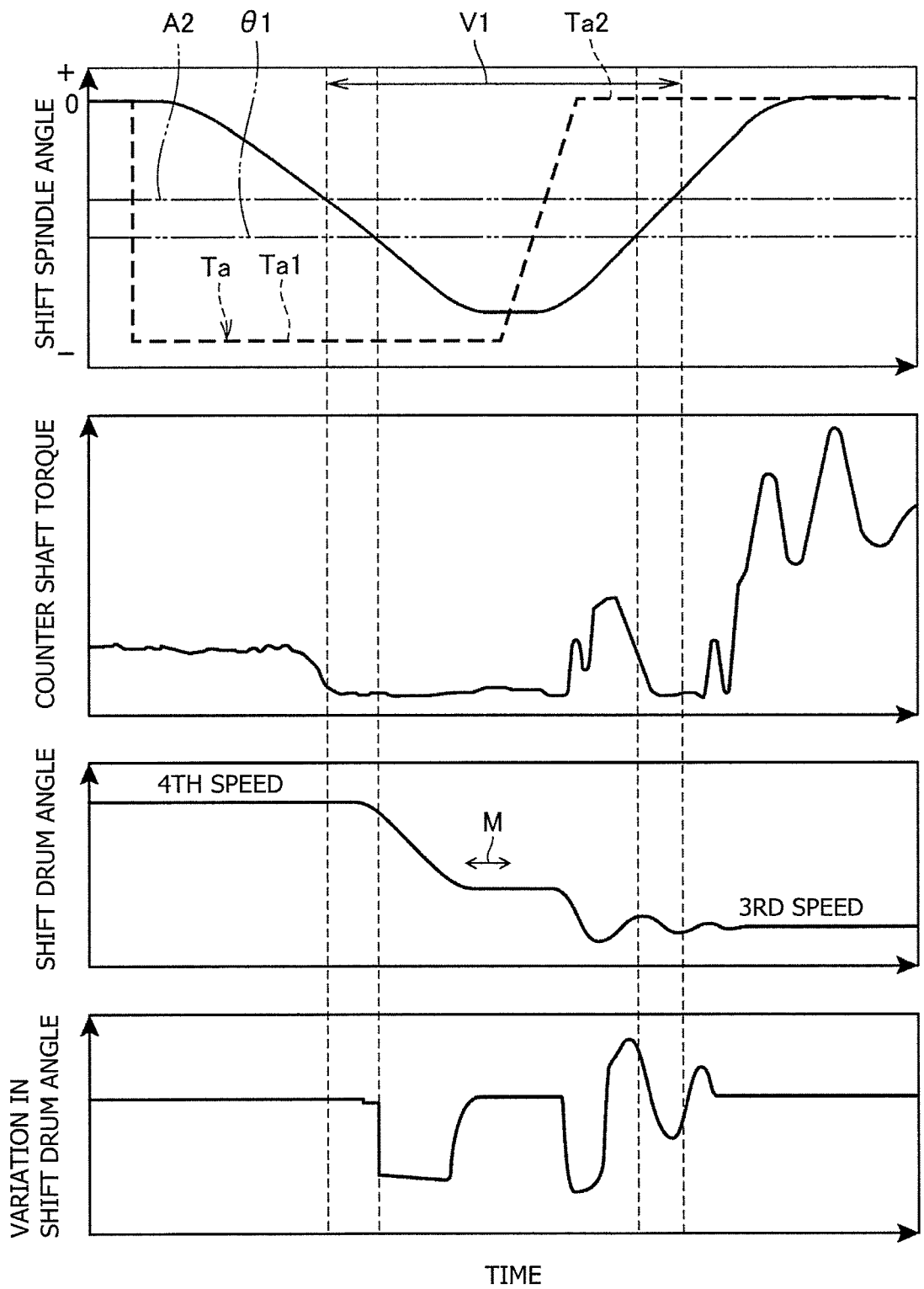
FIG. 23 shows time charts of operations of the automatic speed change apparatus during a shift-down.

FIGS. 22 and 23 show time charts of an operation of the automatic speed change apparatus 25 at the time of shifting-down. In FIGS. 22 and 23, time is taken on the axis of abscissas, while the angle of the shift spindle 76, the torque on the counter shaft 66, and the angle of the shift drum 70 are taken on the axis of ordinates. In FIG. 23, variation in the angle of the shift drum 70 is further taken on the axis of ordinates.

As shown in FIGS. 22 and 23, in each time chart representing the angle of the shift spindle 76, a target angle pattern Ta for the angle of the shift spindle 76 set by the control unit 17 is also shown. The control unit 17 drives the shift motor 75 so that the angle of the shift spindle 76 will follow up to the target angle pattern Ta.

The target angle pattern Ta has a disengaging-side target angle Ta1 (first target rotational angle) at which the angle of the shift spindle 76 becomes the greatest on the disengaging direction side in this process; a returning-side target angle Ta2 as a target angle on the clutch engaging-side in returning the shift spindle 76 to the neutral position (0°); and a clutch-disengaging shift spindle angle θ1.

When the angle of the shift spindle 76 is increased and the clutch is disengaged at a rotational position A2, the torque on the counter shaft 66 is lowered because the power supply from the engine 21 ceases. Thereafter, the torque again increases when the clutch is engaged.

In each of FIGS. 22 and 23, as a state of the angle of the shift drum 70, the state of the angle in the case of a shift from the fourth speed to the third speed is shown as an example. A similar state is observed in each of shift-down operations relevant to other speeds.

Figure 24:
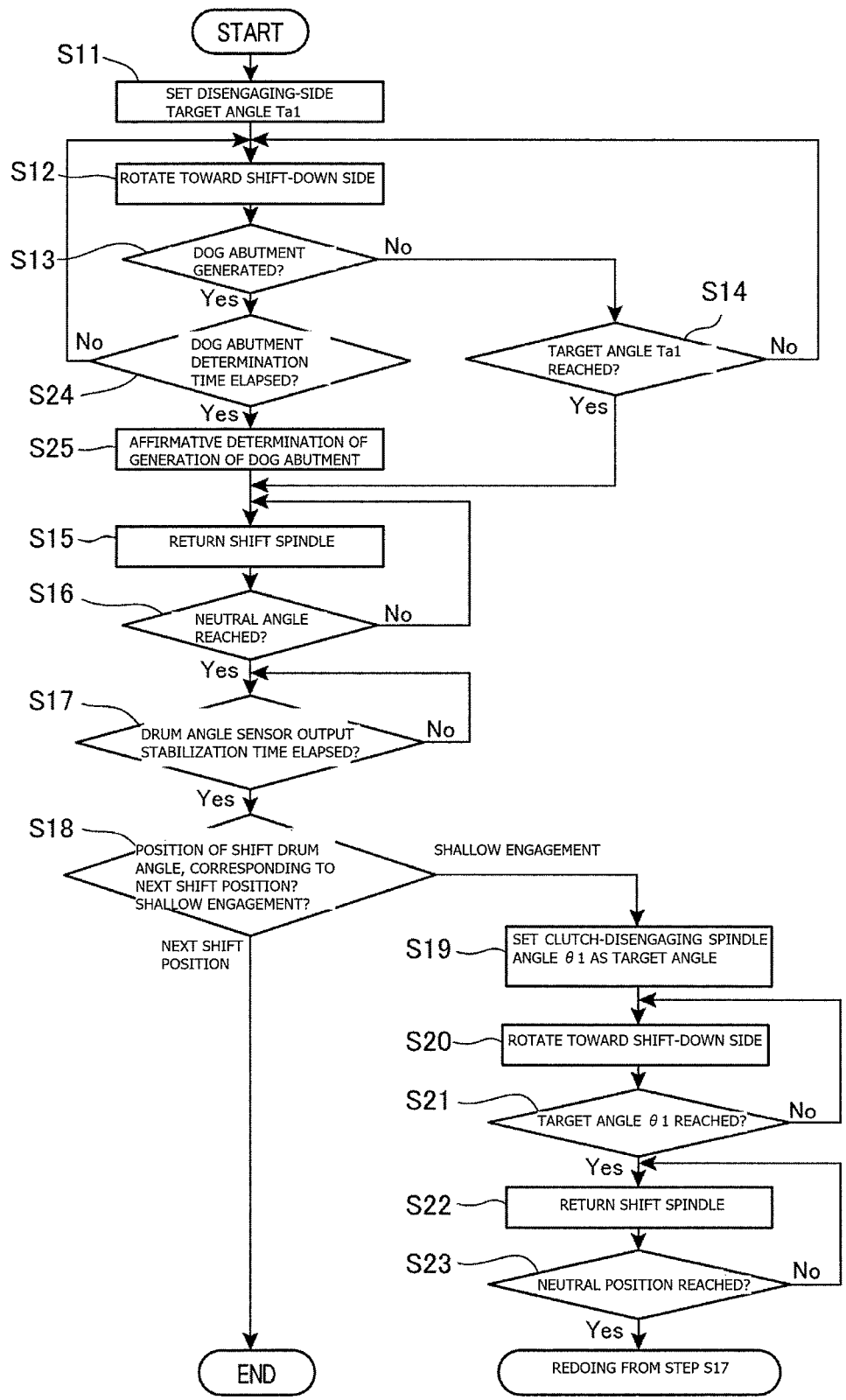
FIG. 24 is a flow chart of a process of the automatic speed change apparatus during a shift-down.

FIG. 24 is a flow chart of a process carried out by the automatic speed change apparatus 25 at the time of shifting-down.

Referring to FIGS. 22 and 24, when a shift-down command is issued, the control unit 17 sets a disengaging-side target angle Ta1 as a target angle for the shift spindle 76 on the clutch-disengaging side (step S11), and drives the shift motor 75 so that the shift spindle 76 will reach the disengaging-side target angle Ta1 (step S12). The disengaging-side target angle Ta1 is set greater than the rotational position A2 of the shift spindle 76 at which the change clutch 61 is completely disengaged. Therefore, the change clutch 61 is disengaged before the shift spindle 76 reaches the disengaging-side target angle Ta1. In step S11 and step S12, as the shift spindle 76 rotates, the change clutch 61 is first disengaged, then the shift drum 70 is rotated, and a shift-down is performed through sliding movement of the driving gear 67b or the driven gear 68c (FIG. 2).

During a period until the shift spindle 76 is rotated to the disengaging-side target angle Ta1, the control unit 17 is constantly determining whether or not dog abutment is generated in the transmission 60 (step S13). The control unit 17 determines that dog abutment is generated, in the case wherein, for example, the rotational angle of the shift drum 70 is between a position corresponding to a predetermined shift position and a position corresponding to the next shift position and wherein a state in which the variation in the angle of the shift drum 70 per unit time is zero has continued for a predetermined period of time.

When the shift drum 70 is rotated according to step S12, dog abutment and shallow engagement may be generated at a dog clutch of gears in the transmission 60. The dog abutment and the shallow engagement will be described taking the driving gear 67b and the driving gear 67c as an example hereinafter.

The transmission 60 is of a constant-mesh type, wherein the driving gear 67b and the driving gear 67c are in relative rotation in a state where they are not coupled. When the driving gear 67b (which is a shifter gear) is slid toward the side of the driving gear 67c (which is a free gear) at the time of a shift, the dog tooth 67b1 and the tog tooth 67c1 may mesh together in a normal depth, or dog abutment may be generated in which top surfaces of the dog teeth 67b1 and 67c1 abut on each other.

The dog abutment is canceled by generation of relative rotation between the driving gear 67b and the driving gear 67c against a frictional force between the top surfaces of the dog teeth 67b1 and 67c1.

However, the driving gear 67b to be driven by the crankshaft 23 side is rotating faster than the driving gear 67c. If the sliding force for the driving gear 67b is insufficient, therefore, side surfaces of the dog teeth 67b1 and 67c1 may contact each other before complete engagement of the dog tooth 67b1 with the dog tooth 67c1. This may result in shallow mesh between the dog teeth 67b1 and 67c1. Such a state in which the depth of mesh between dog teeth is shallower than that in normal mesh is defined as "shallow engagement" here. In a shallow engagement state, a driving force of the engine 21 is acting between the side surfaces of the dog teeth 67b1 and 67c1 being in contact with each other. In this state, therefore, a frictional force is generated between the side surfaces, which makes sliding of the driving gear 67b difficult. Consequently, the shallow engagement state persists.

If dog abutment is not generated (step S13: No), the control unit 17 determines whether or not the disengaging-side target angle Ta1 has been reached by the shift spindle 76 (step S14). If the disengaging-side target angle Ta1 has not been reached (step S14: No), the control process returns to step S12, to continue rotation of the shift spindle 76.

If the disengaging-side target angle Ta1 has been reached (step S14: Yes), the control unit 17 sets a returning-side target angle Ta2, rotates the shift spindle 76 in a returning direction (step S15), and determines whether or not a neutral position has been reached by the shift spindle 76 (step S16).

If the shift spindle 76 has not yet reached the neutral position (step S16: No), the control unit 17 continues the rotation of the shift spindle 76.

In the course of returning from the disengaging-side target angle Ta1 to the returning-side target angle Ta2, the angle of the shift spindle 76 reaches the rotational position A2. At this rotational position A2, the change clutch 61 is again engaged. The period of time during which the change clutch 61 is thus in a disengaged state between the rotational position A2 on the disengaging direction side and the rotational position A2 on the returning direction side is a driving force non-transmission period V1 during which the power of the engine 21 is not transmitted to the main shaft 65. In the driving force non-transmission period V1, the motorcycle 10 runs by inertia. Therefore, the driving force non-transmission period V1 can cause the driver to get an uncomfortable feeling.

If the shift spindle 76 has reached the neutral position (step S16: Yes), the control unit 17 determines whether or not a sensor output stabilization time H1 for the drum angle sensor 70b has elapsed (step S17). If the sensor output stabilization time H1 has not yet elapsed (step S17: No), the control unit 17 waits for the sensor output stabilization time H1 to elapse.

The control unit 17 is constantly detecting the rotational position of the shift drum 70 by the drum angle sensor 70b. The sensor output stabilization time H1 is a preset predetermined time from the first detection by the drum angle sensor 70b of the entrance of the gear position into the next shift position side (third speed side) until an output value of the drum angle sensor 70b is stabilized. When the sensor output stabilization time H1 elapses, vibration of the shift drum 70 is converged, permitting the control unit 17 to accurately detect the rotational position of the shift drum 70.

If the sensor output stabilization time H1 has elapsed (step S17: Yes), the control unit 17 determines whether the angle of the shift drum 70 is at a position corresponding to a next shift position (third speed) or at a shallow engagement position K (step S18). The shallow engagement position K is a position at which the angle of the shift drum 70 is a little in front of a position relevant to the next shift position by an amount corresponding to the shallowness of mesh of the dog teeth.

If the angle of the shift drum 70 is at the position corresponding to the next shift position (third speed) (step S18: next shift position), the control unit 17 finishes the shifting-down process.

If the angle of the shift drum 70 is at the shallow engagement position K (step S18: shallow engagement), the control unit 17 executes a shallow engagement canceling process of steps S19 to S23.

In the shallow engagement canceling process, the control unit 17 sets a clutch-disengaging shift spindle angle θ1 (FIG. 22) as a target angle (step S19), and drives the shift motor 75 so that the angle of the shift spindle 76 will become equal to the clutch-disengaging shift spindle angle θ1 (step S20).

Next, the control unit 17 determines whether or not the shift spindle 76 has reached the clutch-disengaging shift spindle angle θ1 (step S21). If the clutch-disengaging shift spindle angle θ1 has not yet been reached by the shift spindle 76 (step S21: No), the control unit 17 continues rotation of the shift spindle 76 in the disengaging direction.

If the shift spindle 76 has reached the clutch-disengaging shift spindle angle θ1 (step S21: Yes), the control unit 17 sets a returning-side target angle Ta2, rotates the shift spindle 76 in the returning direction (step S22), and determines whether or not the shift spindle 76 has reached the neutral position (step S23). In other words, in the shallow engagement canceling process, when the generation of shallow engagement is detected, the shift spindle 76 is rotated to the clutch-disengaging shift spindle angle θ1 to disengage the change clutch 61, and thereafter the change clutch 61 is engaged. According to this operation, upon disengagement of the change clutch 61, the driving force between the side surfaces of the dog teeth 67b1 and 67c1 is eliminated, permitting the driving gear 67b to slide, and the biasing force of the stopper arm 203 causes the shift drum 70 to be rotated, whereby the shallow engagement is canceled.

If the shift spindle 76 has not yet reached the neutral position (step S23: No), the control unit 17 continues the rotation of the shift spindle 76. If the neutral position has been reached by the shift spindle 76 (step S23: Yes), the control process returns to step S17. After step S17, if the angle of the shift drum 70 is at the position corresponding to the next shift position (step S18: next shift position), the control unit 17 finishes the shifting-down process. If the angle of the shift drum 70 is at the shallow engagement position (step S18: shallow engagement), the control unit executes the shallow engagement canceling process again.

Figure 25:
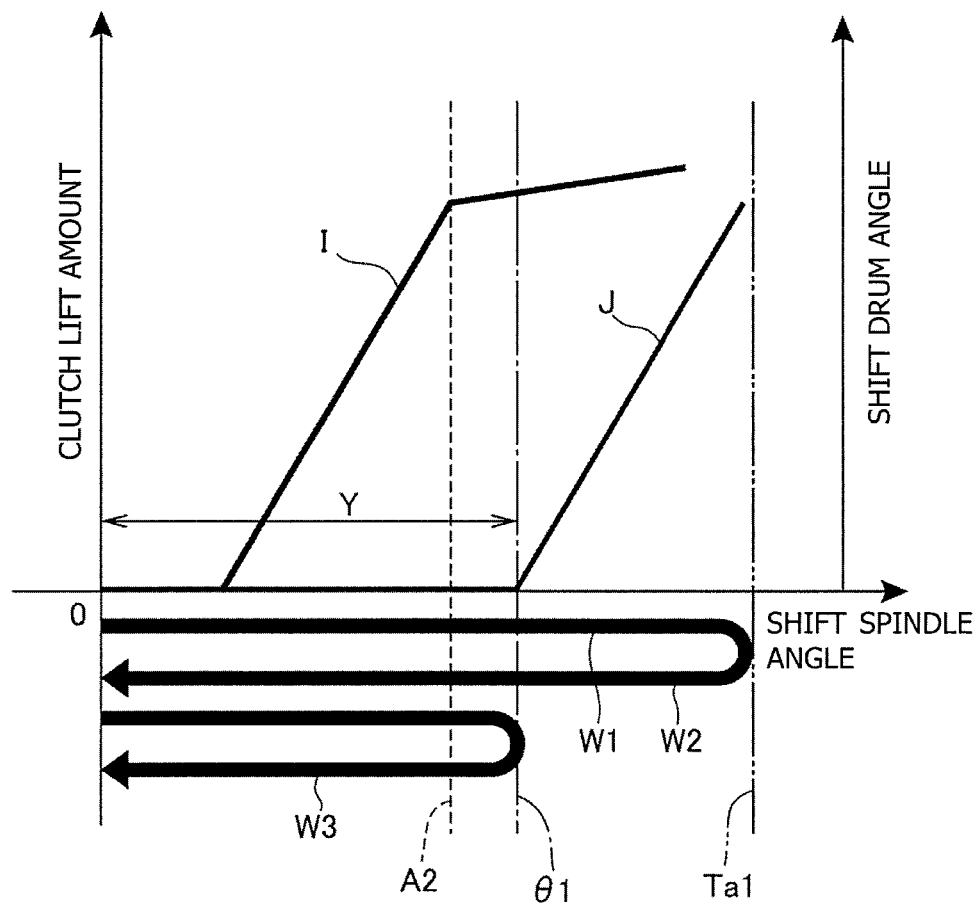
FIG. 25 is a diagram showing operations of the automatic speed change apparatus during a shift-down.

FIG. 25 is a diagram showing an operation of the automatic speed change apparatus 25 at the time of shifting-down.

As shown in FIG. 25, when the shift spindle 76 is rotated by a predetermined amount from the neutral position, first, lift amount I of the change clutch 61 starts increasing, and the change clutch 61 is disengaged at a rotational position A2. In addition, rotational angle J of the shift drum 70 does not increase before the rotational angle of the shift spindle 76 reaches the clutch-disengaging shift spindle angle θ1, but starts increasing when the rotational angle of the shift spindle 76 reaches or exceeds the clutch-disengaging shift spindle angle θ1.

In the present embodiment, the shifting-down process includes a first step W1 of rotating the shift spindle 76 in a disengaging direction until the shift spindle 76 reaches a disengaging-side target angle Ta1; a second step W2 of rotating the shift spindle 76 in a returning direction to return the shift spindle 76 into the neutral position; and a third step W3 of canceling shallow engagement.

The first step W1 corresponds to steps S11 to S14 in FIG. 24. The second step W2 corresponds to steps S15 and S16 in FIG. 24.

In the third step W3, if an output corresponding to shallow engagement is detected from the drum angle sensor 70b, the control unit 17 rotates the shift spindle 76 in the disengaging direction up to the clutch-disengaging shift spindle angle θ1, and then rotates the shift spindle 76 in the returning direction to return the shift spindle 76 to the neutral position. The third step W3 corresponds to steps S18 to S23 in FIG. 24.

More specifically, in the third step W3, the shift spindle 76 is rotated to the clutch-disengaging shift spindle angle θ1, whereby the change clutch 61 is disengaged and the shallow engagement is canceled, followed by returning the shift spindle 76 from the clutch-disengaging shift spindle angle θ1 to the neutral position. In the state in which the shift spindle 76 is located at the position of the clutch-disengaging shift spindle angle θ1, the rotation of the shift drum 70 is at an utterly beginning stage, and a shift-down to a further subsequent shift position (in this embodiment, second speed) is not performed. In addition, in the third step W3, the shift spindle 76 is not rotated to the disengaging-side target angle Ta1 but is returned immediately from the clutch-disengaging shift spindle angle θ1, so that the period of disengagement of the change clutch 61 is short. For this reason, shifting in an amount corresponding to two gear positions can be prevented from occurring during a shifting-down operation including a shallow engagement canceling process. In addition, the period of disengagement of the change clutch 61 can be shortened, and a driving force non-transmission period V2 (FIG. 22) can be thereby shortened.

FIG. 23 shows time charts of an operation of the automatic speed change apparatus 25 in the case where dog abutment is generated at the time of shifting-down.

Referring to FIGS. 23 and 24, if it is determined that dog abutment is generated during rotation of the shift spindle 76 in step S2 in the first step W1 (FIG. 25) (step S13), the control unit 17 determines whether or not a dog abutment determination time M has elapsed (step S24).

If the dog abutment determination time M has not yet elapsed (step S24: No), the control unit 17 stands by until the dog abutment determination time M elapses. With the dog abutment determination time M thus provided, a misdetection of dog abutment can be prevented.

If the dog abutment determination time M has elapsed (step S24: Yes), the control unit 17 determines that dog abutment has been generated (step S25). In this case, even if the rotational angle of the shift spindle 76 has not yet reached the disengaging-side target angle Ta1, the control unit 17 sets a returning-side target angle Ta2, and rotates the shift spindle 76 in the returning direction (step S15). The dog abutment is canceled by the engaging of the change clutch 61 at the rotational position A2 in the returning direction.

Thus, in the present embodiment, upon detection of dog abutment during the first step W1, the control unit 17 proceeds to the second step W2, even if the rotational angle of the shift spindle 76 has not yet reached the disengaging-side target angle Ta1, and rotates the shift spindle 76 in the returning direction. In the condition where dog abutment has occurred, the change clutch 61 has already been disengaged and the change mechanism 89 is operating, so that a shift can be carried out without rotating the shift spindle 76 further. With the rotation of the shift spindle 76 toward the disengaging-side target angle Ta1 wound up in its course, the period of time for which the change clutch 61 is in a disengaged state can be shortened accordingly, and the driving force non-transmission period V1 can be shortened accordingly.

After dog abutment is generated and the dog abutment is canceled, if the angle of the shift drum 70 is at the shallow engagement position K (step S18: shallow engagement), the control unit 17 executes a shallow engagement canceling process of steps S19 to S23. In this case, after the operation of FIG. 26, an operation after time t1 in FIG. 22 is carried out, whereby the shallow engagement is canceled.

Figure 26:
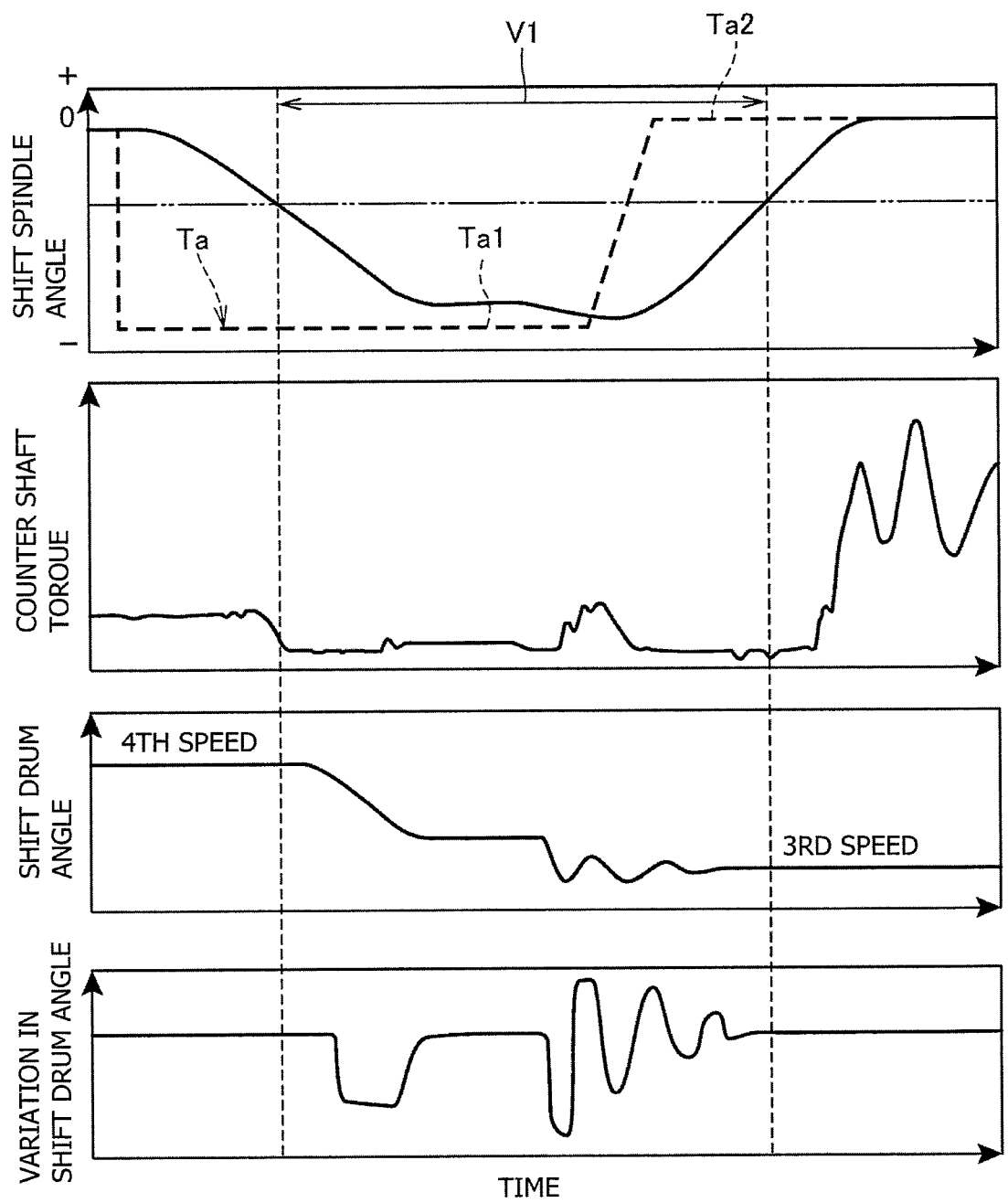
FIG. 26 shows time charts of operations of the automatic speed change apparatus in the case where dog abutment is generated during a shift-down in a comparative example.

FIG. 26 shows time charts of an operation of the automatic speed change apparatus 25 in the case where dog abutment is generated during shifting-down in a comparative example.

In the comparative example shown in FIG. 26, the control unit 17 rotates the shift spindle 76 until the rotational angle of the shift spindle 76 reaches the disengaging-side target angle Ta1, even in the case where it is determined that dog abutment is generated. Therefore, the control unit 17 waits for the rotational angle of the shift spindle 76 to reach the disengaging-side target angle Ta1, so that the driving force non-transmission period V1 would be prolonged accordingly.

In addition, in the present embodiment, the control unit 17 performs a so-called kick down shift in which a shift-down is automatically executed in the case where the throttle opening (angle) set by the throttle grip is rapidly enlarged by the driver. In the case of performing the kick down shift, the control unit 17 controls the output of the engine 21 by interrupting injection at the fuel injection valve 54 or performing retard control of spark advance at the spark plug 57, at the time of engaging the change clutch 61 after a shift-down. At the time of the kick down shift, if it is detected by the drum angle sensor 70b that the shifting to the next shift position has been made by the shift-down, the control unit 17 cancels the interruption of injection at the fuel injection valve 54 and/or the retard control. On the other hand, if it is not detected that the shifting to the next shift position has been made by the shift-down, the control unit 17 limits or restricts the injection at the fuel injection valve 54 and the ignition. Consequently, the torque of the engine 21 can be prevented from becoming excessively high at the time of a kick down shift.

In the present embodiment, a vibration element (not shown) is provided inside the handlebar 11 operated by the driver. The vibration element is connected to the control unit 17. At the time of a shifting operation, the control unit 17 drives the vibration element to inform, by vibration, the driver that a shift is going to be made. This permits the driver to know in advance that a shift is going to be made, whereby the uncomfortable feeling about the driving force non-transmission period V1 can be reduced. In place of the vibration element, a sound-issuing member may be provided in the vicinity of meters or on the handlebar or the like, so as to inform, by sound, the driver that a shift is going to be made.

Further, in the present embodiment, the control unit 17 counts the number of times of shallow engagement at the dog clutch in the transmission 60 per unit traveling distance, and sliding time of the change clutch 61. The sliding time of the change clutch 61 can be obtained, for example, by a method in which values detected by the engine rotational speed sensor 58 and the main shaft rotational speed sensor 65a are compared with each other, and time for which a difference is generated between the detected values under predetermined conditions is counted.

When the frequency of shallow engagement reaches or exceeds a predetermined frequency, the control unit 17 turns on an indicator to urge the driver to put the automatic speed change apparatus 25 to inspection.

In addition, when the sliding time of the change clutch 61 reaches or exceeds a predetermined time, the control unit 17 turns on an indicator to prompt the driver to put the automatic speed change apparatus 25 to inspection. Consequently, where the automatic speed change apparatus 25 needs inspection, the driver can be urged to put it to inspection.

As has been described above, according to the embodiment of the present invention, the automatic speed change apparatus 25 for the motorcycle 10 includes the transmission 60. The transmission 60 includes the main shaft 65 to which rotational power of the crankshaft 23 of the engine 21 is transmitted through the change clutch 61; the counter shaft 66 disposed in parallel to the main shaft 65; the driving gear 67b rotated as one body with the main shaft 65 and movable in the axial direction; the driving gears 67a and 67c rotatable relative to the main shaft 65 and fixed in the axial direction; the dog clutches provided to be engageable and disengageable by the dog teeth 67b1 and 67c1 erected in the axial direction from opposed surfaces of the driving gears 67b and the driving gears 67a and 67c; the driven gear 68c rotated as one body with the counter shaft 66 and movable in the axial direction; the driven gears 68b and 68d rotatable relative to the counter shaft 66 and fixed in the axial direction; the dog clutches provided to be engageable and disengageable by dog teeth erected in the axial direction from opposed surfaces of the driven gear 68c and the driven gears 68b and 68d. The automatic speed change apparatus 25 also includes the change mechanism 89. The change mechanism 89 includes the plurality of shift forks 69a and 69b adapted to move the driving gear 67b and the driven gear 68c in the axial direction; and the shift drum 70 formed in its outer circumference with the plurality of grooves 70a for engagement with end portions of the shift forks 69a and 69b. The automatic speed change apparatus 25 further includes the shift spindle 76 provided with the clutch lever 82 adapted to operate engagement/disengagement of the change clutch 61, and provided, in a relatively rotatable manner, with the master arm 80 adapted to operate the change mechanism 89; the shift motor 75 adapted to drive the shift spindle 76; the shift spindle angle sensor 79 adapted to detect the rotational angle of the shift spindle 76; the control unit 17 adapted to control the shift motor 75; and the drum angle sensor 70b adapted to detect the rotational angle of the shift drum 70. The shift spindle 76 is so configured that, when rotated in the disengaging direction (first direction), the shift spindle 76 first operates the clutch lever 82 to disengage the change clutch 61 and thereafter rotates the master arm 80 to operate the change mechanism 89. The control unit 17 stores, as the clutch-disengaging shift spindle angle $\theta 1$, the position at which the change clutch 61 is disengaged when the shift spindle 76 is rotated in the disengaging direction. The control unit 17 controls the shift spindle 76 by: the first step W1 of rotating the shift spindle 76 in the disengaging direction until the shift spindle 76 reaches the disengaging-side target angle Ta1; the second step W2 of returning the shift spindle 76 in the returning direction (second direction) opposite to the disengaging direction; and the third step W3 of rotating the shift spindle 76 in the disengaging direction up to the clutch-disengaging shift spindle angle $\theta 1$ and thereafter rotating the shift spindle 76 in the returning direction to return the shift spindle 76, upon detection of an output from the drum angle sensor 70b, the output corresponding to shallow engagement of the dog teeth 67b1 and 67c1.

In other words, where shallow engagement is generated at the time of shifting in the first step W1 and the second step W2, the control unit 17 executes the third step W3 to rotate the shift spindle 76 up to the clutch-disengaging shift spindle angle $\theta 1$ previously stored. By this operation, only the change clutch 61 is disengaged, without operating the change mechanism 89, to thereby cancel the shallow engagement. After the shallow engagement is thus canceled, the control unit 17 returns the shift spindle 76. Accordingly, shifting in an amount corresponding to two gear positions (speeds) can be prevented from occurring at the time of a shifting operation including a shallow engagement canceling process. In addition, the period for which the change clutch 61 is put in a disengaged state during such an operation can be shortened, and the driving force non-transmission period V1 during such an operation can be shortened.

At the time of rotating the shift spindle 76 in the disengaging direction, the control unit 17 sets the clutch-disengaging shift spindle angle $\theta 1$, on the basis of the rotational angle $\theta s$ (not shown) of the shift spindle 76 corresponding to the rotational angle of the shift drum 70 at the start of rotation toward the next shift position detected by the drum angle sensor 70b. In the present embodiment, at the time when the shift drum 70 starts rotating toward the next shift position, the change clutch 61 is in a disengaged state. Therefore, the clutch-disengaging shift spindle angle $\theta 1$ can be easily set, on the basis of the rotational angle $\theta s$ of the shift spindle 76 corresponding to the rotational angle at the start of rotation of the shift drum 70. As for variation in the rotational angle at the time when the shift drum 70 starts rotating toward the next shift position, the variation is so large as to be easy to detect by the drum angle sensor 70b. Accordingly, the clutch-disengaging shift spindle angle $\theta 1$ can be set easily.

In addition, the control unit 17 learns the clutch-disengaging shift spindle angle $\theta 1$ through ramp response. Therefore, the control unit 17 can accurately learn the clutch-disengaging shift spindle angle $\theta 1$, on the basis of the rotational angle of the shift spindle 76 being rotated more slowly than during a normal shifting operation.

Further, when dog abutment is detected on the basis of the rotational angle of the shift drum 70 during the first step W1, the control unit 17 proceeds to the second step W2. In a condition where dog abutment has occurred, the change clutch 61 has already been disengaged and the change mechanism 89 is operating. When dog abutment is detected, the control unit 17 winds up the rotation (feeding) of the shift spindle 76 to the disengaging-side target angle Ta1 in its course, and returns the shift spindle 76 by the second step W2. Therefore, even where the dog abutment has been generated, the driving force non-transmission period V1 due to disengagement of the change clutch 61 can be shortened.

Note that the above embodiment is merely an exemplary embodiment of the present invention, and the invention is not to be limited to the above embodiment.

While the dog clutch has been described showing the dog teeth 67b1 and 67c1 as an example in the above embodiment, the invention is not restricted to this. The dog clutch may be one in which a dog tooth provided at a side surface of a gear is engaged with a dog hole provided in a side surface of another gear. In this case, dog abutment occurs between the top surface of the dog tooth and the side surface of the another gear, and shallow engagement occurs between the dog tooth and the dog hole.

While the gear position (speed) is changed by moving the driving gear 67b and the driven gear 68c in the description of the above embodiment, the invention is not limited to this. A configuration wherein the gear position is changed by moving at least one gear may be adopted in the invention.

While the above embodiment describes the case of a shift down as an example, this is not restrictive. A configuration may be adopted in which the first step W1, the second step W2, and the third step W3 are carried out at the time of shifting-up.

Furthermore, while the above embodiment describes the motorcycle 10 as an example of the vehicle, the invention is not limited to this but may be applied to such vehicles as three-wheeled vehicles and four-wheeled vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A speed change apparatus for a vehicle, comprising:
a transmission including:
a main shaft to which rotational power of a crankshaft of an engine is transmitted through a clutch;
a counter shaft disposed in parallel to the main shaft;
a driving-side shifter gear rotated as one body with the main shaft and movable in an axial direction;
a driving-side free gear rotatable relative to the main shaft and fixed in the axial direction;

a dog clutch engageable and disengageable through dog teeth erected in the axial direction from opposed surfaces of the driving-side shifter gear and the driving-side free gear;
a driven-side shifter gear rotated as one body with the counter shaft and movable in the axial direction;
a driven-side free gear rotatable relative to the counter shaft and fixed in the axial direction; and
a dog clutch engageable and disengageable through dog teeth erected in the axial direction from opposed surfaces of the driven-side shifter gear and the driven-side free gear;
a change mechanism including:
a plurality of shift forks adapted to move the driving-side shifter gear and the driven-side shifter gear in the axial direction; and
a shift drum formed in an outer circumferential surface thereof with a plurality of grooves for engagement with end portions of the shift forks;
a shift spindle which is provided with a clutch lever adapted to operate engagement/disengagement of the clutch and is provided, in a relatively rotatable manner, with a master arm adapted to operate the change mechanism;
an actuator adapted to drive the shift spindle;
a shift spindle angle sensor adapted to detect a rotational angle of the shift spindle;
a controller adapted to control the actuator; and
a drum angle sensor adapted to detect a rotational angle of the shift drum;
wherein the shift spindle is configured so that, when rotated in a first direction, the shift spindle first operates the clutch lever to disengage the clutch and thereafter rotates the master arm to operate the change mechanism;
wherein the controller stores as a clutch-disengaging shift spindle angle ($\theta 1$) a position at which the clutch is disengaged when the shift spindle is rotated in the first direction in memory; and
wherein the controller controls the shift spindle by:
a first step (W1) of rotating the shift spindle in the first direction until the shift spindle reaches a first target rotational angle (Ta1);
a second step (W2) of returning the shift spindle in a second direction opposite to the first direction; and
a third step (W3) of rotating the shift spindle in the first direction up to the clutch-disengaging shift spindle angle ($\theta 1$) stored in the memory and thereafter rotating the shift spindle in the second direction to return the shift spindle, upon detection of an output from the drum angle sensor, the output corresponding to shallow engagement of the dog teeth.

2. The speed change apparatus for a vehicle according to claim 1, wherein at the time of rotating the shift spindle in the first direction, the controller sets the clutch-disengaging shift spindle angle ($\theta 1$) on the basis of a rotational angle of the shift spindle corresponding to a rotational angle of the shift drum at a start of rotation to a next shift position detected by the drum angle sensor.

3. The speed change apparatus for a vehicle according to claim 2, wherein the controller learns the clutch-disengaging shift spindle angle ($\theta 1$) through the rotational angle increasing at a substantially constant rate.

4. The speed change apparatus for a vehicle according to claim 3, wherein the controller proceeds to the second step (W2) when dog abutment is detected on the basis of a rotational angle of the shift drum during the first step (W1).

5. The speed change apparatus for a vehicle according to claim 2, wherein the controller proceeds to the second step (W2) when dog abutment is detected on the basis of a rotational angle of the shift drum during the first step (W1).

6. The speed change apparatus for a vehicle according to claim 1, wherein the controller proceeds to the second step (W2) when dog abutment is detected on the basis of a rotational angle of the shift drum during the first step (W1).

7. The speed change apparatus for a vehicle according to claim 1, wherein the master arm is rotated in a shift-down direction in response to a shift-down command, and
wherein a shift-down pressing portion comes into contact with one locking pin from below and rotates the shift drum in the shift-down direction through the locking pin.

8. The speed change apparatus for a vehicle according to claim 7, wherein the shift-down pressing portion rotates the shift drum against a biasing force of a stopper arm.

9. The speed change apparatus for a vehicle according to claim 8, wherein the shift-down pressing portion rotates the shift drum against the biasing force of the stopper arm until a roller comes beyond a cam ridge of a star-shaped plate wherein the shift drum automatically rotates to a position corresponding to the next shift position even after the shift-down pressing portion is separated from the locking pin.

10. The speed change apparatus for a vehicle according to claim 9, wherein the master arm has been completely fed in the shift-down direction, the shift-down pressing portion is separated from the locking pin wherein if the shift drum is rotated to such a position that the roller comes beyond the cam ridge of the star-shaped plate, the master arm is rotatable in the opposite direction, independently from the shift drum.

11. A speed change apparatus for a vehicle, comprising:
a change mechanism including:
a plurality of shift forks adapted to move a driving-side shifter gear and a driven-side shifter gear in an axial direction; and
a shift drum formed in an outer circumferential surface thereof with a plurality of grooves for engagement with end portions of the shift forks;
a shift spindle having a clutch lever adapted to operate engagement/disengagement of a clutch, said shift spindle being provided, in a relatively rotatable manner, with a master arm adapted to operate the change mechanism;
an actuator adapted to drive the shift spindle;
a shift spindle angle sensor adapted to detect a rotational angle of the shift spindle;
a controller adapted to control the actuator; and
a drum angle sensor adapted to detect a rotational angle of the shift drum;
wherein the shift spindle is configured so that, when rotated in a first direction, the shift spindle first operates the clutch lever to disengage the clutch and thereafter rotates the master arm to operate the change mechanism;
the controller stores as a clutch-disengaging shift spindle angle ($\theta 1$) a position at which the clutch is disengaged when the shift spindle is rotated in the first direction in memory; and
the controller controls the shift spindle by:
a first step (W1) of rotating the shift spindle in the first direction until the shift spindle reaches a first target rotational angle (Ta1);

a second step (W2) of returning the shift spindle in a second direction opposite to the first direction; and a third step (W3) of rotating the shift spindle in the first direction up to the clutch-disengaging shift spindle angle (θ1) stored in the memory and thereafter rotating the shift spindle in the second direction to return the shift spindle, upon detection of an output from the drum angle sensor, the output corresponding to shallow engagement of dog teeth of a dog clutch engageable and disengageable through the dog teeth erected in the axial direction from opposed surfaces of the driven-side shifter gear and a driven-side free gear.

12. The speed change apparatus for a vehicle according to claim 11, wherein at the time of rotating the shift spindle in the first direction, the controller sets the clutch-disengaging shift spindle angle (θ1) on the basis of a rotational angle of the shift spindle corresponding to a rotational angle of the shift drum at a start of rotation to a next shift position detected by the drum angle sensor.

13. The speed change apparatus for a vehicle according to claim 12, wherein the controller learns the clutch-disengaging shift spindle angle (θ1) through the rotational angle increasing at a substantially constant rate.

14. The speed change apparatus for a vehicle according to claim 13, wherein the controller proceeds to the second step (W2) when dog abutment is detected on the basis of a rotational angle of the shift drum during the first step (W1).

15. The speed change apparatus for a vehicle according to claim 12, wherein the controller proceeds to the second step (W2) when dog abutment is detected on the basis of a rotational angle of the shift drum during the first step (W1).

16. The speed change apparatus for a vehicle according to claim 11, wherein the controller proceeds to the second step (W2) when dog abutment is detected on the basis of a rotational angle of the shift drum during the first step (W1).

17. The speed change apparatus for a vehicle according to claim 11, wherein the master arm is rotated in a shift-down direction in response to a shift-down command, and wherein a shift-down pressing portion comes into contact with one locking pin from below and rotates the shift drum in the shift-down direction through the locking pin.

18. The speed change apparatus for a vehicle according to claim 17, wherein the shift-down pressing portion rotates the shift drum against a biasing force of a stopper arm.

19. The speed change apparatus for a vehicle according to claim 18, wherein the shift-down pressing portion rotates the shift drum against the biasing force of the stopper arm until a roller comes beyond a cam ridge of a star-shaped plate wherein the shift drum automatically rotates to a position corresponding to the next shift position even after the shift-down pressing portion is separated from the locking pin.

20. The speed change apparatus for a vehicle according to claim 19, wherein the master arm has been completely fed in the shift-down direction, the shift-down pressing portion is separated from the locking pin wherein if the shift drum is rotated to such a position that the roller comes beyond the cam ridge of the star-shaped plate, the master arm is rotatable in the opposite direction, independently from the shift drum.

* * * * *